(12) United States Patent
Govindan et al.

(10) Patent No.: US 8,098,641 B2
(45) Date of Patent: Jan. 17, 2012

(54) METHOD FOR SELECTIVE DISTRIBUTION OF COMMUNICATIONS INFRASTRUCTURE

(75) Inventors: Saravanan Govindan, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 809 days.

(21) Appl. No.: 12/159,379

(22) PCT Filed: Dec. 28, 2005

(86) PCT No.: PCT/JP2005/024283
§ 371 (c)(1), (2), (4) Date: Jun. 26, 2008

(87) PCT Pub. No.: WO2007/077619
PCT Pub. Date: Jul. 12, 2007

(65) Prior Publication Data
US 2010/0202422 A1    Aug. 12, 2010

(51) Int. Cl.
*H04W 4/00* (2009.01)

(52) U.S. Cl. ........................................ 370/338

(58) Field of Classification Search .................. 370/338, 370/339, 341, 216, 230, 328
See application file for complete search history.

(56) References Cited

U.S. PATENT DOCUMENTS

| | | | |
|---|---|---|---|
| 6,097,703 A | 8/2000 | Larsen | |
| 6,659,947 B1 | 12/2003 | Carter | |
| 2002/0176390 A1 | 11/2002 | Sparr | |
| 2003/0099212 A1 | 5/2003 | Anjum | |
| 2003/0157962 A1* | 8/2003 | Tourrilhes | 455/557 |
| 2005/0054342 A1 | 3/2005 | Otsuka | |
| 2005/0078636 A1 | 4/2005 | Zhang | |
| 2005/0100045 A1* | 5/2005 | Hunkeler et al. | 370/465 |
| 2005/0152305 A1 | 7/2005 | Ji | |
| 2005/0174962 A1 | 8/2005 | Gurevich | |

OTHER PUBLICATIONS

International Search Report dated Sep. 11, 2006.
EPC Office Action dated Oct. 1, 2009, issued in corresponding European Patent Application No. 05824468.2.

* cited by examiner

*Primary Examiner* — Huy Vu
*Assistant Examiner* — Dady Chery
(74) *Attorney, Agent, or Firm* — Seed IP Law Group PLLC

(57) ABSTRACT

A wireless communication system is provided for configuring a multihop chain while suppressing the cost and complexity. In this system, one network controller (NC) (105) for executing the infrastructure function distributes the scheduling information to a plurality of communication entities (WCE) (110, 115, 120, 210, 215) configuring the multihop chain for alternating operation in the infrastructure function mode and the client function mode. The WCE (110, 115, 120, 210, 215) alternately operates the infrastructure function and the client function according to the distributed control and operations information.

12 Claims, 15 Drawing Sheets

METHOD FOR SELECTIVE DISTRIBUTION OF COMMUNICATIONS INFRASTRUCTURE

TECHNICAL FIELD

The present invention pertains to operations of communications networks and, more particularly, it relates to the selective distribution of infrastructure functions among a plurality of communications entities.

BACKGROUND ART

[Prior-Art 1] U.S. Pat. No. 6,097,703 A, "Multi-hop packet radio networks," August 2000.
[Prior-Art 2] U.S. Pat. No. 6,659,947 B1, "Wireless LAN architecture for integrated time-critical and non-time-critical services within medical facilities," December 2003.
[Prior-Art 3] US 2005/010 0045 A1, "Access points with selective communication rate and scheduling control and related methods for wireless local area networks (WLANs)," May 2005.
[Prior-Art 4] US 2005/007 8636 A1, "System and method of handling IP layer mobility in a wireless network," April 2004.
[Prior-Art 5] US 2002/017 6390 A1, "Wireless mesh network node," Nov. 2002.

Wireless technologies are applied to diverse applications. Increasingly, they are used to interface communications entities covering large geographic areas. Such applications comprise wireless surveillance cameras located on street lamps across many kilometers, wireless users gathering in large exhibition centers and wireless terminals located in vehicles traveling along stretches of highways. Furthermore, such applications of wireless technologies typically involve wireless entities that are geographically far from each other, but are logically united. For instance, wireless surveillance cameras all relate to a logical security system, wireless users in exhibition centers relate to a single or plurality of companies and wireless terminals on highways relate to a single or plurality of wireless service providers.

[Cost of Deployment]

There are a number of challenges with realizing such applications. The primary among them is the cost of deploying communications infrastructure units such as access points, wireless terminal points and base transceiver stations. Because of the geographic spread of wireless communications entities in these applications, a large number of infrastructure equipment are required. The costs of deploying such communications systems would therefore be tremendous and prohibitive.

Furthermore, given their spread across large areas, few wireless communications entities will be provided service by each of the communications infrastructure units. This results in limited use of the communications infrastructure.

Additionally, communications equipment units for large geographies require extensive cabling for interconnection. This is further exacerbated by the limitations of cable lengths, such as the 100 meters limit on Ethernet cable lengths. In these cases, switches or routers are used for extension. Naturally, these devices add costs to the realization of distributed wireless applications.

It is envisioned that there will also be increasing requirements for communications infrastructure units to be cost-effectively deployed over large geographies. The limitations of wired cables prevent such deployments.

[Complexity of Operation]

Related to the cost of the switches and routers, is the complexity of extending infrastructure control across such devices. Switches and routers are typically used to delimit network segments. When communications infrastructure units of a distinct logical network cross network segments, their control is complicated. This is due to Internet Protocol (IP) segments.

Another complexity issue is the presence of network address translator (NAT) devices. NATs have been deployed in communications networks to multiplex IP addresses in a local network segment with IP addresses in an external network segment. Additionally, NATs may incorporate firewalls to restrict communications exchanges.

It is clear from these points, that the complexity of deploying distributed wireless applications over geographically diverse communications network is tremendous.

[Current General Approach]

A current approach to addressing the problems of deploying geographically diverse wireless applications is the use of mesh networks. In such networks, communications equipment units and mobile wireless terminals are interconnected in a mesh structure. Each network entity acts as both traffic source or destination and as traffic relaying point. Mesh network entities comprise multiple antennas or radios in order to perform the dual tasks of transmission/reception and relaying.

[Problems with Mesh]

Mesh networks are characterized by the effectiveness of their routing mechanisms. Due to the distributed nature of mesh networks, each network entity must determine and establish efficient routes with its peers.

The diversity of traffic paths available in a mesh network makes route determination complex and time-consuming. Furthermore, with the plurality of available routes across different mesh paths, there is significant overhead in the form of path status message exchange overheads and processing overheads—to determine the most appropriate route for traffic. The overheads of route computation and management deter wide-spread deployments of mesh networks. Consequently, geographically distributed wireless applications are not well supported by mesh networks.

Furthermore, the inherent uncertainty of wireless links complicates the efficiency of mesh network routing mechanisms.

Such problems of limited communications equipment coverage, interconnection complexity, mesh network route complications and costs severely restrict the deployment of communications networks capable of supporting geographically distributed wireless networks and applications.

[Prior-Art 1] illustrates a method for extending the geographic range of communications network by means of opportunistic transmission by constituent mobile wireless terminals. According to the method, mobile wireless terminals monitor the status of their links and select a neighbour to whom link conditions are most favourable. However, such a method has no bounds of operation, which therefore makes it unpredictable and prone to errors or transmission loops.

[Prior-Art 2] presents a method for an access point of a communications network to operate in accordance to two protocols. This method allows an access point to change its operating protocol in accordance with the application needs of mobile wireless terminals. The method however does not extend the geographic scope of the communications network infrastructure to mobile wireless terminals beyond the direct reach of the access point.

[Prior-Art 3] illustrates a method for increasing traffic capacity of a communications network by means of scheduling transmission queues on the basis of different transmission rates. This method is limited to the operation of a single communications network entity and as such is not suitable for networks with large geographic scope.

[Prior-Art 4] presents a system in which an intermediate session node is used to buffer traffic for a mobile wireless terminal moving from a first to a second communications network. The intermediate session node serves to assist in the continuity of a communications session during a mobile wireless terminal's transition. This method is only applicable to a unidirectional stream from a communications network to a mobile wireless terminal. It is not suitable for the reverse stream.

[Prior-Art 5] presents a method for establishing mesh networks through the use of sectored antennas. These are used to distinguish between traffic transmission or reception and traffic relay. While each sector of an antenna helps in the creation of neighbourhood routes, the method does not overcome the problems of high operational complexity and costs.

The prior arts discussed insofar illustrate the lack of existing mechanisms to address the needs of geographically distributed wireless applications. In particular, these needs comprise simple, cost-effective establishment of communications and operation across large geographic areas while maintaining logical unity.

DISCLOSURE OF INVENTION

In view of the above discussed problems, it is the objective of the present invention to provide systems and methods for distributing select infrastructure functions among a single or plurality of wireless communications entities.

It is another objective of the invention to provide methods for organizing communicating entities of a communications network in a single or plurality of multihop chain organizations.

It is yet another objective of the invention to provide methods for scheduling and changing modes of communications operations among communicating entities of multihop chain organizations.

It is another objective of the invention to provide methods for coordinating change of modes of communications operations among communicating entities of multihop chain organizations.

It is yet another objective of the invention to provide methods for adjusting hop counters of communications messages exchanged among communicating entities of multihop chain configurations The present invention addresses the problems relating to extending communications network coverage across large geographic areas. In particular, the invention addresses the problems of cost and complexity in establishing and operating communications networks over diverse areas. The invention also addresses the problem of maintaining logical communications integrity across large communications networks.

In its broadest aspect, the present invention provides a system for distributed operations of a communications network comprising, means for determining select infrastructure operations; and means for distributing selected infrastructure operations among a single or plurality of communicating entities; whereby, said distributed select infrastructure operations are performed by a single or plurality of communicating entities on behalf of a network controller of said communications network.

In a preferred form of the invention for distributing select infrastructure operations, said infrastructure operations comprise beacon signal processing, probe signal processing, data traffic processing, control traffic processing, radio channel processing, communications network coordination and values of operating parameters.

In another aspect, the current invention presents a system for distributed operations of a communications network comprising; means for changing modes of communications operations; and means for scheduling change in communications operations modes; whereby, communicating entities change mode of communications operations between communications operated on behalf of a network controller and communications operated on behalf of said communicating entities.

In a preferred form of the invention for distributed operations of a communications network, said communicating entities change between communications operations in infrastructure functions mode and communications operations in client functions mode.

Another aspect of the present invention presents a system for organizing communicating entities of a communications network comprising, means for assigning communicating entities to a single or plurality of multihop chain organizations; whereby, communications are conducted over a singular communications path between any two communicating entities constituting said multihop chain configurations.

In another aspect of the invention for a system of coordinating communications among a multihop chain configuration of a communications network comprising, means for assigning communications schedules to communicating entities; and means for buffering communications traffic from a first communications schedule for subsequent communications exchanges during a second communications schedule; and whereby, communications are conducted between pairs of communicating entities of a multihop chain configuration, said pairs of communicating entities changing in accordance to said communications schedules.

In yet another aspect of the present invention, a system for coordinating communications among a multihop chain configuration of a communications network is presented wherein said system comprises means for triggering change in mode of communications operations; and whereby, communicating entities adjust a single or plurality of operations timers in accordance, with said mode change trigger means.

Another aspect of the invention presents a system for conducting communications in a multihop chain configuration of a communications network comprising, means for adjusting a single or plurality of hop counters for communications messages exchanged among communicating entities constituting said multihop chain configuration.

BEST MODE FOR CARRYING OUT THE INVENTION

In the following description, for the purpose of explanation, specific numbers, times, structures and other parameters are set forth in order to provide a thorough understanding of the present invention. However, it will be apparent to those skilled in the art that the present invention may be practiced without these specific details.

Embodiment 1

Distributing Infrastructure Functions

Figure 1:
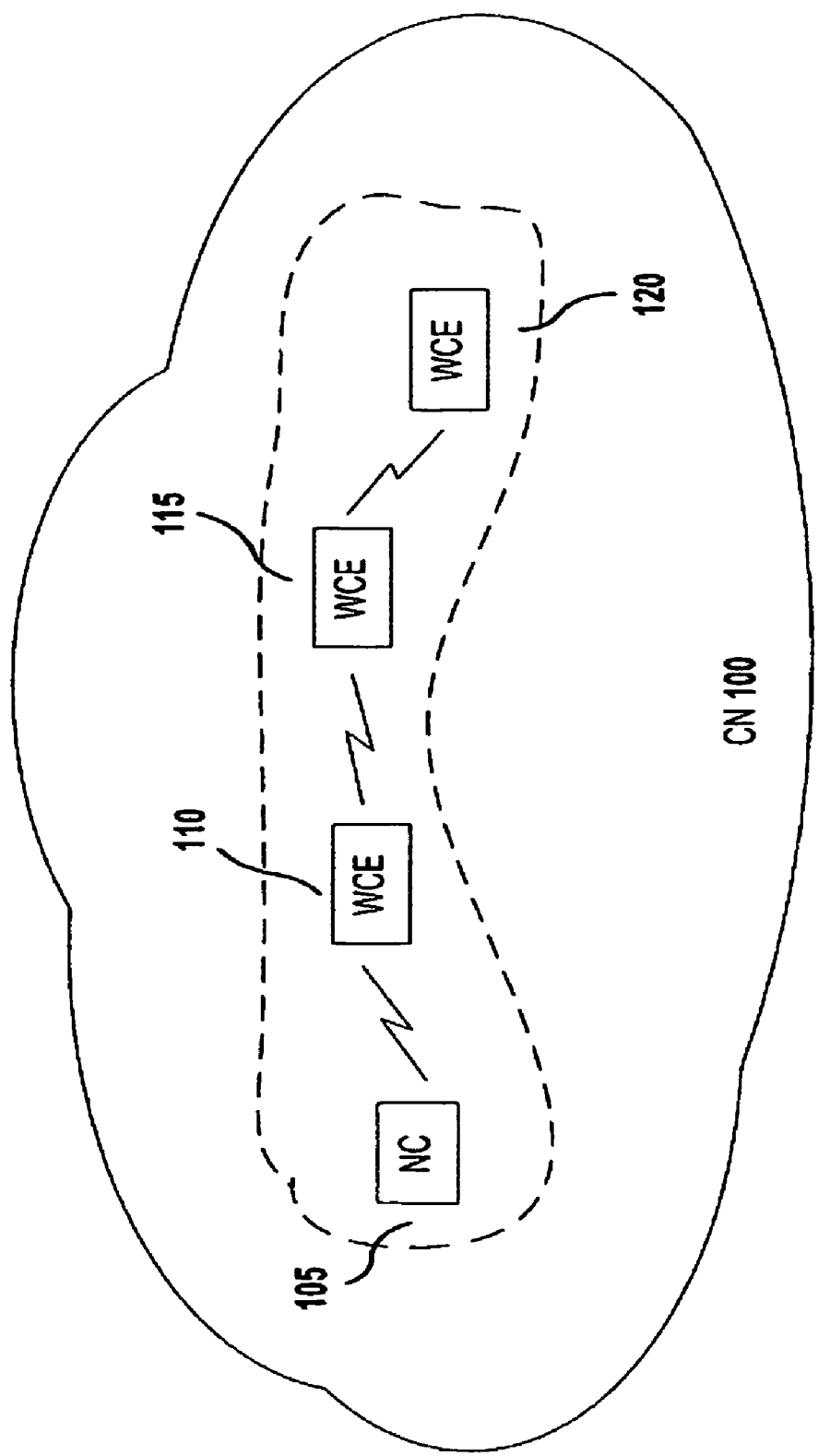
FIG. 1 illustrates a communications network comprising network controller and mobile wireless terminals within which the present invention operates.

With reference to FIG. 1, a communications network (CN) (100) in accordance with the current invention is illustrated. CN (100) comprises a network controller (NC) (105) and a single or plurality of wireless communications entities (WCE) (110), (115) and (120).

NC (105) is representative of a controller entity capable of coordinating network resources, provisioning and configuring WCEs, such as WCE (110), (115) and (120), and coordinating communications flows among them. WCEs are representative of communications devices such as wireless access points and mobile terminals, capable of transmitting and receiving communications traffic.

In accordance with the invention for selective distribution of infrastructure functions, WCEs of CN (100) are organized in a multihop configuration, heretofore referred to as multihop chain. Each multihop chain of WCEs is connected to NC (105). Consequently, NC (105) communicates with WCEs over intermediate WCEs. As an example, in FIG. 1, communications between NC (105) and WCE (120) are exchanged via intermediate WCE (110) and (115). According to the invention, CN (100) is also characterized by a single communications path between NC (105) and any WCE (110), (115) or (120) within a multihop chain.

WCEs comprising multihop chains are communicably coupled with other WCEs by means of wireless interfaces such as Bluetooth, IEEE 802.11, IEEE 802.16, GPRS and WCDMA. NC (105) is communicably coupled with multihop chains by means of wired or wireless links, by either direct means or indirect means through alternative communications entities such as wireless access points or base transceiver stations.

In accordance with the present invention, NC (105) distributes selected infrastructure functions and associated parameters to WCEs of a multihop chain. The infrastructure functions represent those that are typically executed by infrastructure equipment of communications networks such as wireless access points, access controllers, base transceiver stations and mobile switching centers. Infrastructure functions of a communications network comprise beacon signal processing—further comprising signal generation and distribution; probe signal processing; data traffic processing— further comprising aggregation and forwarding; radio channel processing—further comprising measurement and evaluation; and network coordination—further comprising WCE handling. The associated parameters of infrastructure functions comprise network identifications—further comprising SSID, BSSID and ESSID; radio channel frequency; beacon schedules and formats; and network authorization lists.

In accordance with the invention, client functions represent those that are typically executed by WCEs. In a case of WCEs being mobile terminals, client functions comprise beacon and probe signal processing; communications traffic transmission and reception. In a case of WCEs being infrastructure equipment of communications networks such as wireless access points, access controllers, base transceiver stations and mobile switching centers, client functions comprise communications traffic transmission and reception; data traffic processing—further comprising aggregation and distribution; radio channel measurement and reporting; and network organization—further comprising mobile terminal management.

For each WCE (110), (115) or (120) participating a multihop chain, NC (105) provides it with selected infrastructure functions and associated parameters. The WCE then executes the received infrastructure functions on behalf of NC (105) in coordinated manner with respect to NC (105) and other WCEs of the multihop chain. Consequently, the communications coverage of CN (100) is extended across WCE (110), (115) and (120). Each WCE (110), (115) and (120) then correspondingly generates beacon signals, processes probe signals from mobile terminals, aggregates data traffic and manages communications sessions with mobile terminals and other WCEs.

In accordance with the invention, NC (105) provides each WCE (110), (115) and (120) with scheduling information for alternating operations in infrastructure functions mode and in client functions mode. The scheduling information allows the two modes of operation to be coordinated within a multihop chain for consistency among WCEs (110), (115) and (120).

As a result of the distribution of selected infrastructure functions from NC (105) to WCEs (110), (115) and (120), the geographic coverage of CN (100) can be efficiently and cost-effectively extended across large geographies. Each extension simply requires an additional WCE capable of operating in accordance with the invention. The need for expensive and complex cabling and routing equipment is negated. Furthermore, the integrity of NC (105) is maintained across the extended CN (100) as each intermediate WCE (110), (115) and (120) perform infrastructure functions consistent with the instructions of NC (105).

Embodiment 2

Interconnection of WCEs

Figure 2:
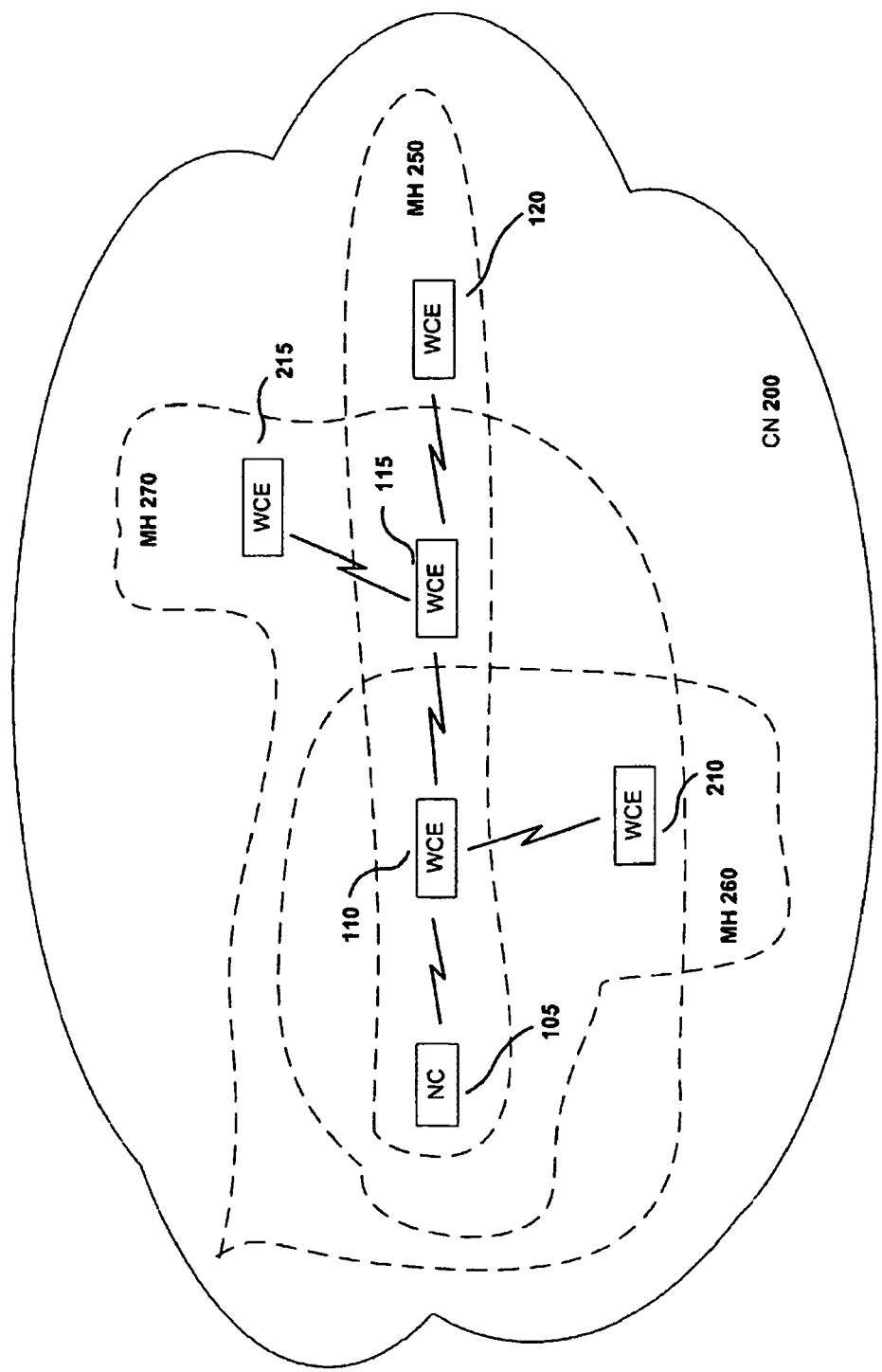
FIG. 2 depicts a further communications network within which the present invention operates.

FIG. 2 is illustrative of a communications network CN (200) comprising a plurality of WCEs (110), (115), (120), (210) and (215). Each WCE is constituent of a single or plurality of logical multihop chains (MH) (250), (260) and (270). The WCEs are communicably coupled by wireless means. The coupling may be based on any single or plurality of wireless technologies such as Bluetooth, IEEE 802.11, IEEE 802.16, GPRS and WCDMA. The present invention of selective distribution of functions is applicable in all cases of wireless coupling means.

In accordance with the invention, each MH (250), (260) and (270) represent a distinct logical entity managed by NC (105). For instance, WCE (110) and (210) of MH (260) may be wireless cameras that are representative of the surveillance assets of a security organization with a centralized control entity in NC (105). As another example, WCE (110), (115) and (215) of MH (270) may be mobile terminals that are representative of a group of users in communications. Communications traffic from each MH (250), (260) and (270) is mutually separated in the upstream and downstream directions. The multihop chain organization extends the coverage of a CN (200) while simultaneously maintaining a single or plurality of logical unities among WCEs (110), (115), (120), (210) and (215) comprising CN (200).

FIG. 2 illustrates that a WCE may be constituent of a single or plurality of multihop chains. For instance, WCE (110) is constituent of MH (250), (260) and (270) while WCE (115) is constituent of MH (250) and (270). Each such constituency is treated as a distinct logical relationship. So communications and processing operations for each multihop chain are handled distinctly by WCE (110) and (115) constituting plurality of multihop chains. WCE operations for each multihop chains are correspondingly coordinated to avoid deadlocks, interferences and other collisions.

Each MH (250), (260) and (270) comprise a single communications path between NC (105) and their respective WCEs (110), (115), (120), (210) and (215). Downstream communications from NC (105) and upstream communications to NC (105) are conducted over the single path in opposite directions. So unlike the prior arts, in which a plurality of routes or paths are present, the present invention comprises paths in a single dimension. As a result, the invention does not require any complex routing or switching mechanisms. So for each multihop chain MH (250), (260) and (270), there is a single communications path connecting NC (105) and all respective WCE (110), (115), (120), (210) and (215).

With the multihop chains, each WCE communicates with its immediate neighbour WCE in each downstream and upstream directions. For instance, within MH (270), WCE (115) communicates with WCE (215) in the downstream direction and with WCE (110) in the upstream direction. The direction of communications is coordinated among neighbour WCEs to avoid deadlocks, interferences and other collisions.

As a result of the multihop chain organization, the present invention extends the controlling effect of NC (105) across vast geographies while maintaining logical integrity of WCE (110), (115), (120), (210) and (215) within MH (250), (260) and (270). The advantage of the single dimensional multihop chain configuration is that complex and processing-intensive routing and/or switching are avoided. The single path between controller and WCEs allows for cost-effective deployments.

Embodiment 3

Sequence of Switching Operations

Figure 3:
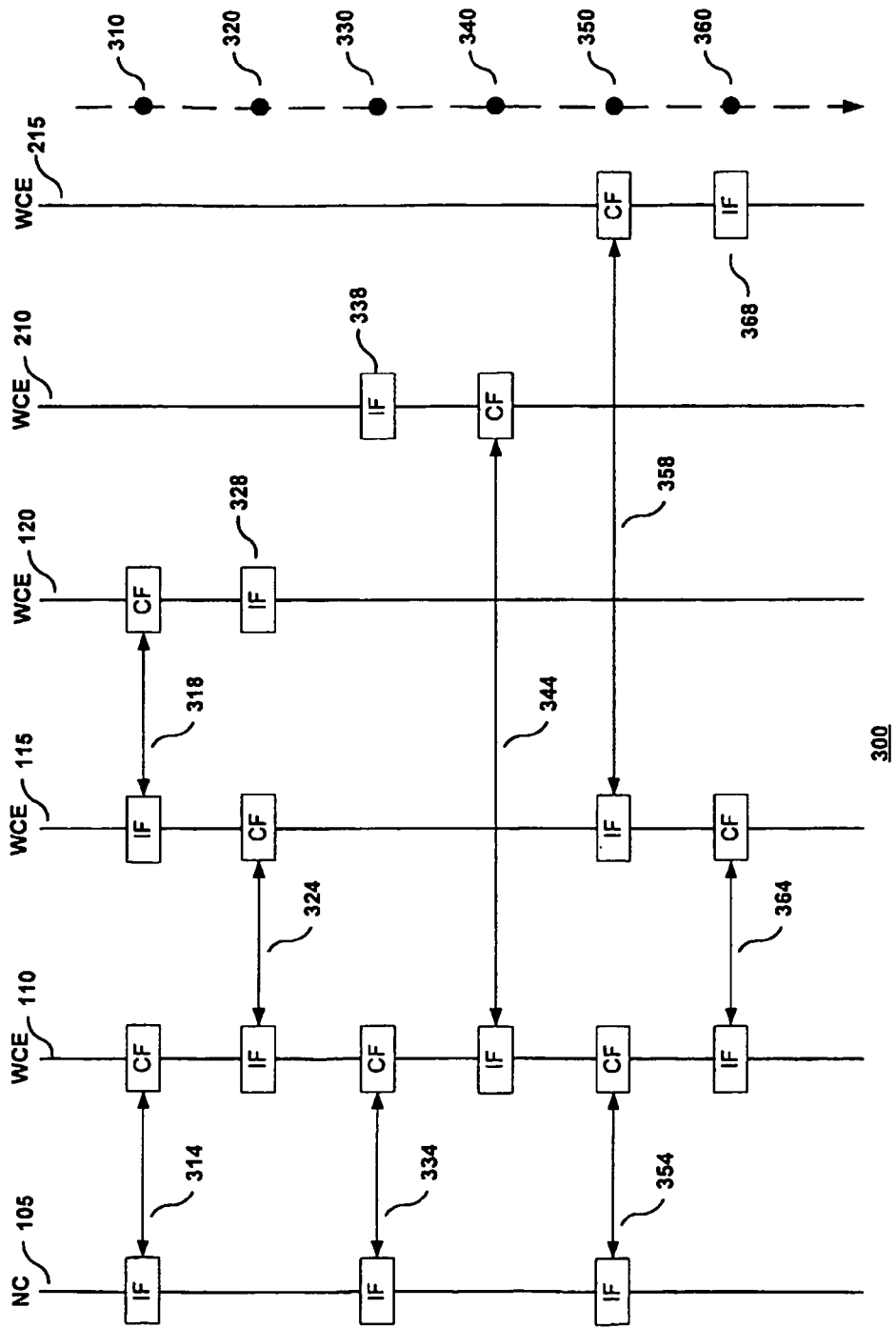
FIG. 3 illustrates a sequence of coordination operations of the invention

The multihop chain configurations of the present invention comprise a network controller and WCEs coordinating their infrastructure functions (IF) and client functions (CF) operations in respective IF-mode and CF-mode. FIG. 3 is illustrative of a sequence of coordinated operations (300) among multihop chains MH (250), (260) and (270) of CN (200). WCE (110), (115) and (120) constitute MH (250). WCE (110) and (210) constitute MH (260). WCE (110), (115) and (215) constitute MH (270).

In the current embodiment, NC (105) has distributed infrastructure functions and associated parameters to each WCE of the multihop chains MH (250), (260) and (270). The WCEs are also made aware of coordination schedules for communications within a single or plurality of multihop chains.

In a time period (310), communications are conducted within MH (250). Here in a step (314), NC (105) operates in IF-mode and communicates with WCE (110), which operates in CF-mode. Among the infrastructure functions, NC (105) transmits control and data traffic destined for WCE (110) and other downstream WCEs; processes control information—such as statistics and error information—received from WCE (110) and other downstream WCEs; and receives data traffic from WCE (110). Among the client functions, WCE (110) receives control and data traffic from NC (105); processes control information received from NC (105); transmits control and data traffic generated by WCE (110); and transmits control and data traffic received from any previous communications with downstream neighbour WCEs such as WCE (120).

In the same time period (310), WCE (115) and (120) are in communications in IF-mode and CF-mode, respectively, in a step (318). In its IF-mode, WCE (115) transmits control and data traffic destined for WCE (120) and other downstream WCEs; processes control information received from WCE (120) and other downstream WCEs; and receives control and data traffic from WCE (120) and other downstream WCEs. In its CF-mode, WCE (120) transmits control and data traffic generated by WCE (120) and those received from any other downstream WCEs and processes control information received from WCE (115).

Steps (314) and (318) occur during the time period (310). Each of the communicating pairs, NC (105) and WCE (110) and WCE (115) and WCE (120), operate in a non-interfering manner. In one instance, a plurality of NC or WCE pairs communicating during a time period within a multihop chain operate on distinct radio channels. In another instance, the plurality of NC or WCE pairs operate on predetermined time offsets within the time period. The predetermined time offsets may be relative within the plurality of NC or WCE pairs or may be in reference to a fixed timing signal. In yet another instance, the plurality of NC or WCE pairs operate using directional antennas configured for non-interfering communications among each of the communicating pairs. In another instance, the plurality of NC of WCE pair operate on predetermined transmission and reception schedules.

Next, in a time period (320), WCEs of MH (250) change their mode of operation in response to operations schedules or triggers. The operations schedules may be pre-determined during initialization or during earlier exchange of control information. During time period (320), WCE (110) changes from CF-mode to IF-mode operations, while WCE (115) changes from IF-mode to CF-mode operations. So WCE (110) and WCE (115) conduct communications in a step (324) of time period (320). IF-mode operations of WCE (110) in time period (320) are similar to IF-mode operations of WCE (115) in time period (310). CF-mode operations of WCE (115) in time period (320) are similar to CF-mode operations of WCE (120) in time period (310). So in a step (324) of time period (320), WCE (110) and WCE (115) conduct communications.

Also during time period (320), WCE (120) changes from CF-mode to IF-mode operations. WCE (120) then operates on behalf of NC (105) in IF-mode in a step (328). In IF-mode, WCE (120) broadcasts beacon frames over the wireless channel. The beacon frames are constructed based on control information received from NC (105) over the multihop chain MH (250). The channel of operation, transmission power, frequency of beacon transmission and other parameters are made available to WCE (120) in previous exchanges of control information. WCE (120) also responds to probe messages received from other WCEs. In this case, WCE (120) provides operational information to the other WCEs. In IF-mode, WCE (120) buffers connection request messages received from other WCEs requesting entry to the MH (250) multihop chain. These requests are aggregated for a single or plurality of other WCEs and then transmitted to the upstream WCE (115) in another time period when WCE (120) operates in CF-mode. WCE (120) also gathers radio channel statistics information and buffers them for transmission during CF-mode operations.

In a time period (330), WCEs of MH (260) conduct communications. NC (105) and WCE (110) communicate in IF-mode and CF-mode, respectively, in a step (334). In a step (338), WCE (210) operates in IF-mode. In a time period (340), WCEs of MH (260) change operation modes. So in a step (344), WCE (110) and WCE (210) communicate in IF-mode and CF-mode, respectively.

In a time period (350), WCEs of MH (270) conduct communications. NC (105) and WCE (110) communicate in IF-mode and CF-mode, respectively, in a step (354). In a step (358), WCE (115) and WCE (215) communicate in IF-mode and CF-mode, respectively. In a next time period (360), WCEs of MH (270) change operation modes. So in a step (364), WCE (110) and WCE (115) communicate in IF-mode and CF-mode, respectively. WCE (215) also changes operation modes during time period (360) in a step (368). Here, WCE (215) changes to IF-mode and performs infrastructure functions on behalf of NC (105).

The communications schedule for MH (250), (260) and (270) are repeated in subsequent time periods.

The current invention for distribution of infrastructure functions allows for the reach of CN (200) to be extended over large geographic areas while maintaining the controlling influence of NC (105). FIG. 3 highlights that communications in the present invention are conducted in pairs of WCEs or pairs of NC and WCE. The communicating pairs are coordinated for IF-mode and CF-mode operations.

This embodiment highlights the operational capabilities of the invention in extending network control across large geographies over multihop chain configurations. It indicates the advantage of distributing infrastructure functions such that they may be processed on behalf of network controllers by other WCEs. The simple operations of multihop chain WCEs allow the invention to be easily realized in current and new communications entities.

Embodiment 4

Message Format

The operations of the disclosed invention may be realized by means of a selective distribution of infrastructure (SDI) protocol. SDI protocol messages are exchanged among network controller and multihop chain WCEs for the distribution of infrastructure functions, control and data traffic, statistics and other information.

Figure 4:
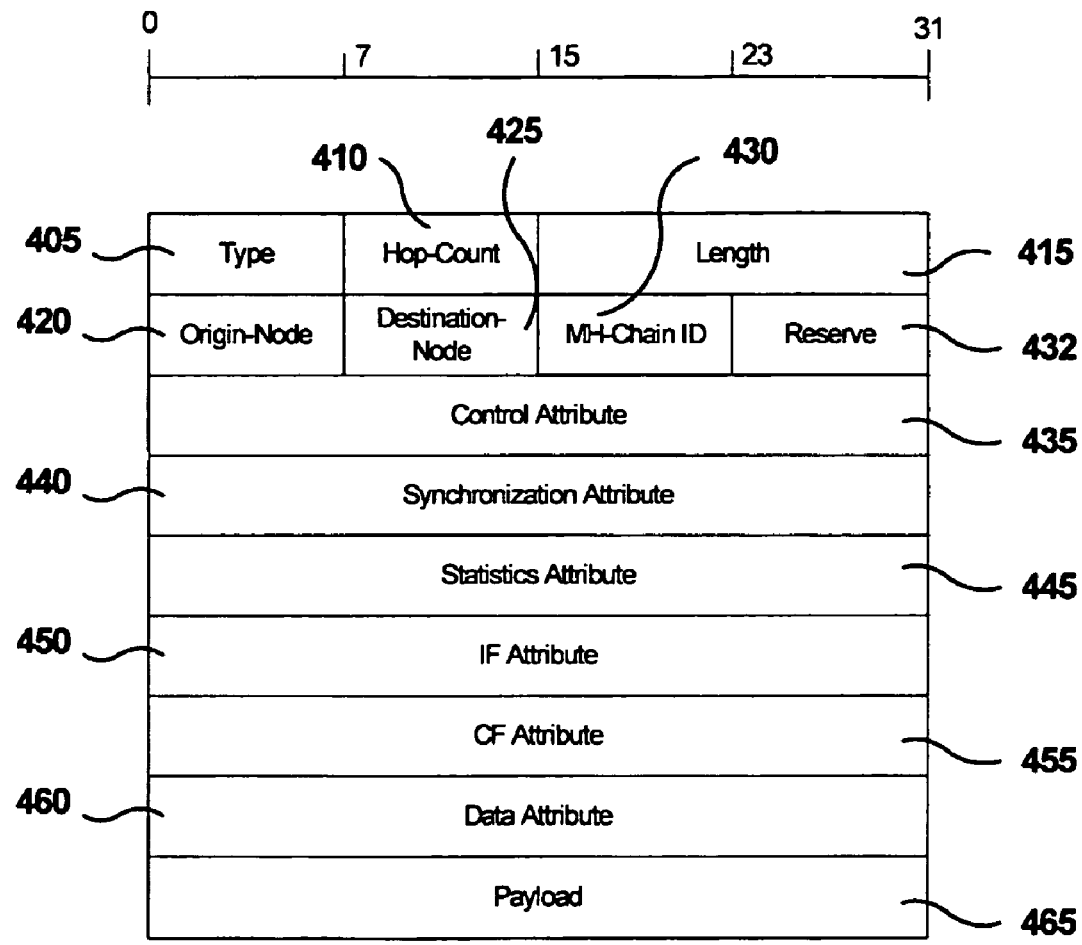
FIG. 4 depicts a message format for messages exchanged in accordance with the present invention for selectively distributing infrastructure functions.

The message format (400) for exchanging SDI protocol messages among NC multihop chain WCEs and NC is illustrated in FIG. 4. SDI messages may be transported over other protocols such as IP, TCP, UDP, IETF CAPWAP, IEEE 802.11, GSM and WCDMA. The message format (400) indicates 16-bytes header followed by a single or plurality of SDI attributes.

The 1-byte Type field (405) denotes the type of SDI message that is exchanged. It is assigned a value currently unassigned by the Internet Assigned Numbers Authority (IANA). The value of the Type field (405) may signify any one of SDI messages, such as control or data message destined for recipient NC or WCE; control or data message destined for downstream or upstream NC or WCE; and synchronization message applicable to all multihop chain entities along the multihop chain path.

The next 1-byte Hop-Count field (410) signifies the number of hops the SDI message has made so far across the multihop chain from the message originator. The value of this field is incremented by one by each recipient of the SDI message other than the intended final recipient. This field is used to track path loops or other adverse conditions. In one case, it can be determined if there are loops in the multihop chain from the value of the Hop-Count field (410) in comparison to the total count of WCEs in the multihop chain.

The 2-bytes Length field (415) denotes the total length of the SDI message inclusive of SDI attributes and payload.

The Origin Node field (420) signifies the identity of the NC or WCE initiating the SDI message. In one aspect of the invention, each NC or WCE in a multihop chain is assigned numeric identities. For instance, NC is assigned identity of '0' and each subsequent downstream WCE in the multihop chain is assigned identities' of incrementally ascending values, such as '1', '2', '3' etc. In another aspect of the invention, each NC or WCE in a multihop chain is assigned identities based on their respective Medium Access Control (MAC) addresses.

The Destination Node field (425) signifies the identity of the NC or WCE that is the ultimate recipient of the SDI message. This field is distinct from the Hop-Count field (410), which is indicative of the NC or WCE currently receiving the SDI message. In one aspect of the invention, the multihop chain entity at which the values of Hop-Count field (410) and Destination Node field (425) match denotes the entity at which the SDI message is ultimately processed. A special Destination Node field (425) value is used to indicate all WCEs comprising the multihop chain. This value is used to distribute SDI control messages that all WCEs of the multihop chain require.

The MH-Chain ID field (430) is a 1-byte field identifying the multihop chain within which the SDI message is exchanged. In one aspect of the invention, MH-Chain ID (430) is assigned a value based on the MAC address of the network controller interface used for communications with a multihop chain. In another aspect, MH-Chain ID (430) is assigned a unique value by NC during the initial exchanges with a first downstream WCE.

Reserve field (432) is used for exchanging additional information and for future updates to the SDI protocol.

The subsequent fields after Reserve field (432) contain attributes related to various operations of the SDI protocol. A Control attribute (435) comprises control information such as Mode-Change triggers and acknowledgements, transmission rate settings and error correction parameters. The attribute also comprises operational details such as channel selection, transmission rate and timing offsets.

A Synchronization attribute (440) comprises information relating to timing schedules such as timing mechanisms, Clock Sync signals and timing offsets.

A Statistics attribute (445) comprises values for monitored metrics such as interference levels, loss rates, retransmission attempts, transmission volumes and delays. The information from Statistics attribute (445) may be used to update SDI protocol operations.

An IF attribute (450) comprises information related to the infrastructure functions mode of operations. This attribute comprises a list of selected infrastructure functions and associated parameters that a WCE will process on behalf of a NC.

A CF attribute (455) comprises information related to the client functions mode of operations. This attribute comprises a list of parameters needed for CF-mode operations.

A Data attribute (460) comprises information on the data payload of the SDI message. This attribute comprises information on the format of the data payload and any security features for that payload.

A Payload field (465) comprises the payload of the SDI message. This comprises data or control traffic.

In one illustration relating to CN (200) in FIG. 2, NC (105) is assigned an Origin Node (420) value of '0' and each subsequent downstream WCE (110), (115) and (120), of MH (250) is assigned identification value of '1', '2' and '3', respectively. Then when NC (105) sends a SDI message to WCE (115), the SDI message contains Origin Node (420) value of '0', Destination Node (425) value of '2' and Hop-Count (410) value of '0'. This message is sent first to an intermediary WCE (110). At WCE (110), the Hop-Count (410) value is updated to '1' and matched with the Destination Node (425) value. Due to a negative match, the updated SDI message is sent to WCE (115). Finally, at WCE (115), the Hop-Count value is updated to '2' and matched with the Destination Node (425) value. Due to a positive match, WCE (115) processes the SDI message together with the attributes.

This embodiment highlights the message format for the SDI protocol operating in accordance with the invention for selective distribution of infrastructure functions. The message format structures exchanges among NC and WCEs of a multihop chain so that control and data traffic are appropriately propagated.

SDI message exchanges are secured between the Origin Node and Destination Node. Intermediate WCEs along the multihop chain do not have access to change SDI messages that they are not ultimately responsible for.

Embodiment 5

SeCT Synchronization Across Multihop Chains

The operations of the current invention are coordinated among the plurality of NC and WCEs comprising a multihop chain. In one aspect of the embodiment, the coordination is based on an external entity such as a Global Positioning System (GPS). In this aspect, timing operations of each NC and WCE are synchronized to a common external entity. Each change of operations mode, such as from IF-mode to CF-mode, is performed simultaneously. The duration of operating in a given mode is also consistent across the multihop chain.

Figure 5:
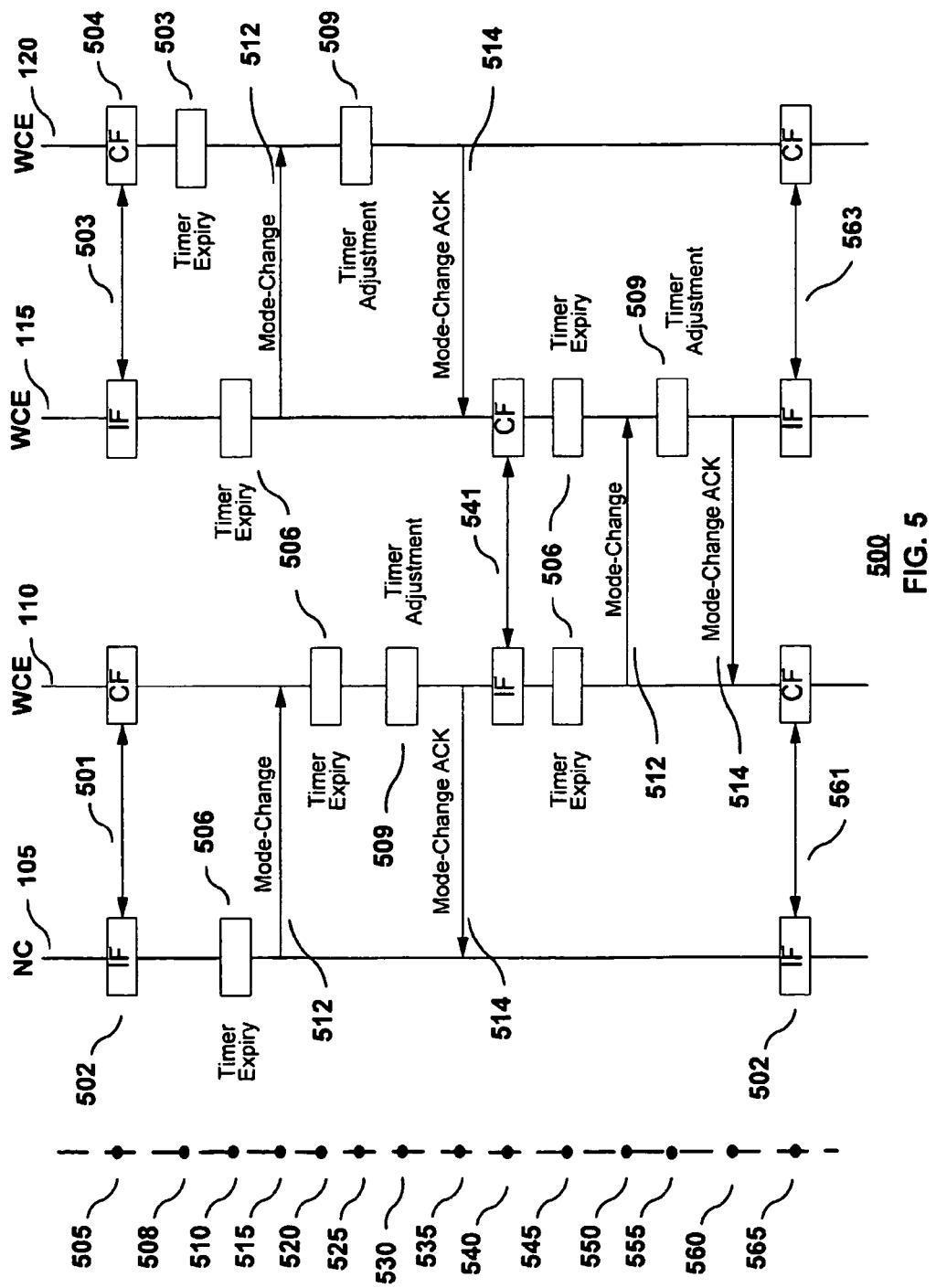
FIG. 5 depicts a sequence of timer coordination operations

In another aspect of the embodiment, a self-correction timer (SeCT) mechanism is used. The sequence of operations (500) in FIG. 5 is illustrative of the mechanism. Here, NC (105) maintains a master clock for coordination. The master clock signals are propagated throughout the multihop chain MH (250) among WCE (110), (115) and (120).

NC (105) provides each WCE of MH (250) a schedule for operations in IF-mode (502) and CF-mode (504). For example, a schedule may comprise IF-mode operations for 5 ms, CF-mode operations for 5 ms and alternating between the two operating modes. NC (105) also provides WCEs of MH (250) a schedule for clock synchronization mode of operations. This mode is operable upon expiry of the operations timer maintained by NC (105) and by WCE (110), (115) and (120) of MH (250). Clock synchronization mode operations are used to coordinated the timers of WCEs so as to coordinate their relative IF-mode (502) and CF-mode (504) operations. Clock synchronization operations are scheduled between each transition among IF-mode and CF-mode operations. For example, clock synchronization operations may be scheduled for 2 ms between each change of IF-mode and CF-mode operations. Operation timers are maintained for each mode of operation.

From sequence (500), NC (105) and WCE (110) conduct communications in a step (501) during timer period (505). Here, NC (105) operates in IF-mode (502) and WCE (110) operates in CF-mode (504). During the same time period (505), WCE (115) and WCE (120) are in communications in a step (503). Here, WCE (115) and WCE (120) operate in IF-mode (501) and (503), respectively. Each of the communicating entities may be in different points in their respective operations schedules. For example, NC (105) may be nearing the completion of its 5 ms IF-mode (502) operations, while WCE (110) may yet be approaching the same level of completion of its 5 ms CF-mode (503) operations.

In accordance with the SeCT mechanism, upon expiry of the operations timer in a step (506), NC (105) operating in IF-mode (502), commences clock synchronization operations during a time period (510). Similarly, operations timer for WCE (115) operating in IF-mode, expires during time period (510). In an illustrative case, the operations timer expiry step (506) occurs at a later time period (520) for WCE (110) operating in CF-mode. In another illustrative case, the operations timer expiry step (506) occurs at an earlier time period (508) for WCE (120) operating in CF-mode. The differences in timer values may be due to causes comprising varying clock update mechanisms among NC and WCEs and random timing offsets. Upon expiry of their operations timers, WCE (110) and WCE (120), enters their clock synchronization operations mode during time periods (520) and (508), respectively.

In a time period (515), NC (105) and WCE (115) send Mode-Change trigger signals (512) to WCE (110) and WCE (120), respectively. The trigger informs WCE (110) and WCE (120) of the expiry of the operations timer maintained by their respectively communicating entities operating in IF-mode (502). Mode-Change trigger (512) also indicates that a change in the operations mode of WCE (110) and WCE (120) is expected. Then, WCE (110) and WCE (120) use the Mode-Change trigger (512) and its arrival time to adjust their respective operations timers. The operations timers are adjusted during time periods (530) and (525) for WCE (110) and WCE (120), respectively.

In an illustrate case of WCE (110), operations timer expires after the arrival of the Mode-Change trigger (512) from NC (105). This indicates that the clock maintained by WCE (110) lags the clock maintained by NC (105). So in the clock adjustment step (509) during time period (530), WCE (110) brings forward its clock in accordance with the clock maintained by NC (105). In one aspect of the embodiment, the clock adjustment step (509) during time period (530), comprises measuring the time difference between arrival of Mode-Change trigger (512) and expiry of operations timer maintained by WCE (110). The time difference is then used to bring forward the clock of WCE (110). For a first example, if the timer of WCE (110) lags by 1 ms, it receives Mode-Change trigger (512) 1 ms before its timer for CF-mode operations expires. So in response to the trigger signal and its arrival time, WCE (110) adjusts its timer by advancing it by 1 ms.

In an illustrative case of WCE (120), operations timer expires before the arrival of the Mode-Change trigger (512) from WCE (115). This indicates that the clock maintained by WCE (120) leads the clock maintained by WCE (115). So in the clock adjustment step (509) during time period (525), WCE (120) brings back its clock in accordance with the clock maintained by WCE (115). In one aspect of the embodiment, the clock adjustment step (509) during time period (525), comprises measuring the time difference between the expiry of operations timer maintained by WCE (120) and arrival of Mode-Change trigger (512). The time difference is then used to bring back the clock of WCE (120). For example, if the timer of WCE (120) leads by 2 ms, it receives Mode-Change trigger (512) 2 ms after its own timer for CF-mode operations expires. So in response to the trigger signal and its arrival time, WCE (120) adjusts its timer by bringing it back by 2 ms.

In general, according to this aspect of the embodiment, a WCE communicating in CF-mode adjusts its timer based on the arrival of Mode-Change trigger signals received from a NC or WCE communicating in IF-mode. The WCE adjusting its timer measures either the elapsed time interval since its CF-mode operations timer expired or the elapsed time interval between receiving a Mode-Change trigger signal and the expiry of its own timer. The measured time interval is used to adjust its timer. After the clock synchronization operations, the WCEs in the multihop chain operate with consistent timing coordination.

After adjusting its timer in accordance with the arrival time of Mode-Change trigger (512), WCE (110) responds to NC (105) with a Mode-Change acknowledgement signal (514) in a time period (535). This indicates to NC (105) that WCE (110) has adjusted its operations timer and is ready to change its operations to IF-mode (502). Similarly, after adjusting its timer in step (509) during time period (525), WCE (120) responds to WCE (115) with a Mode-Change acknowledgement (514). Upon receiving the Mode-Change acknowledgement (514), both NC (105) and WCE (115) are informed of the adjusted timers.

Then, during time period (540), WCE (110) changes its operations to IF-mode and WCE (115) changes its operations to CF-mode. WCE (110) and WCE (115) conduct communications in step (541).

Then during time period (545), operations timer of WCE (110) operating in IF-mode expires in a step (506). In response, WCE (110) commences its clock synchronization operations and sends Mode-Change trigger (512) to WCE (115) operating in CF-mode. Correspondingly, upon expiry of its own operations timer, WCE (115) receives the Mode-Change trigger (512) and adjusts its timer during its adjustment time period (555). So, WCE (115) measures any time difference between its timer expiry (506) and receipt of Mode-Change trigger (512) and uses this for the adjustment step (509). Then WCE (115) responds with a Mode-Change acknowledgement (514) during time period (560), indicating to WCE (110) that it has adjusted its timer and is ready to change operations to IF-mode (504).

During time period (565), WCE (110) changes operations to CF-mode (504) and conducts communications with NC (105) in step (561). During time period (565), WCE (115) changes operations to IF-mode (502) and communicates with WCE (120) operating in CF-mode (502). WCE (115) and WCE (120) conduct communications in step (563).

The current embodiment illustrates the coordination method for the invention of selectively distributing infrastructure functions. The coordination method, SeCT, allows the timers of multihop chain entities to be coordinated in reference to the master clock maintained by the network controller. SeCT also advantageously provides for timer correction features in its operations. As a result adjustments for timers are continuously made to deliver coordination among multihop chain communications entities.

Embodiment 6

Operations Sequence

Figure 6:
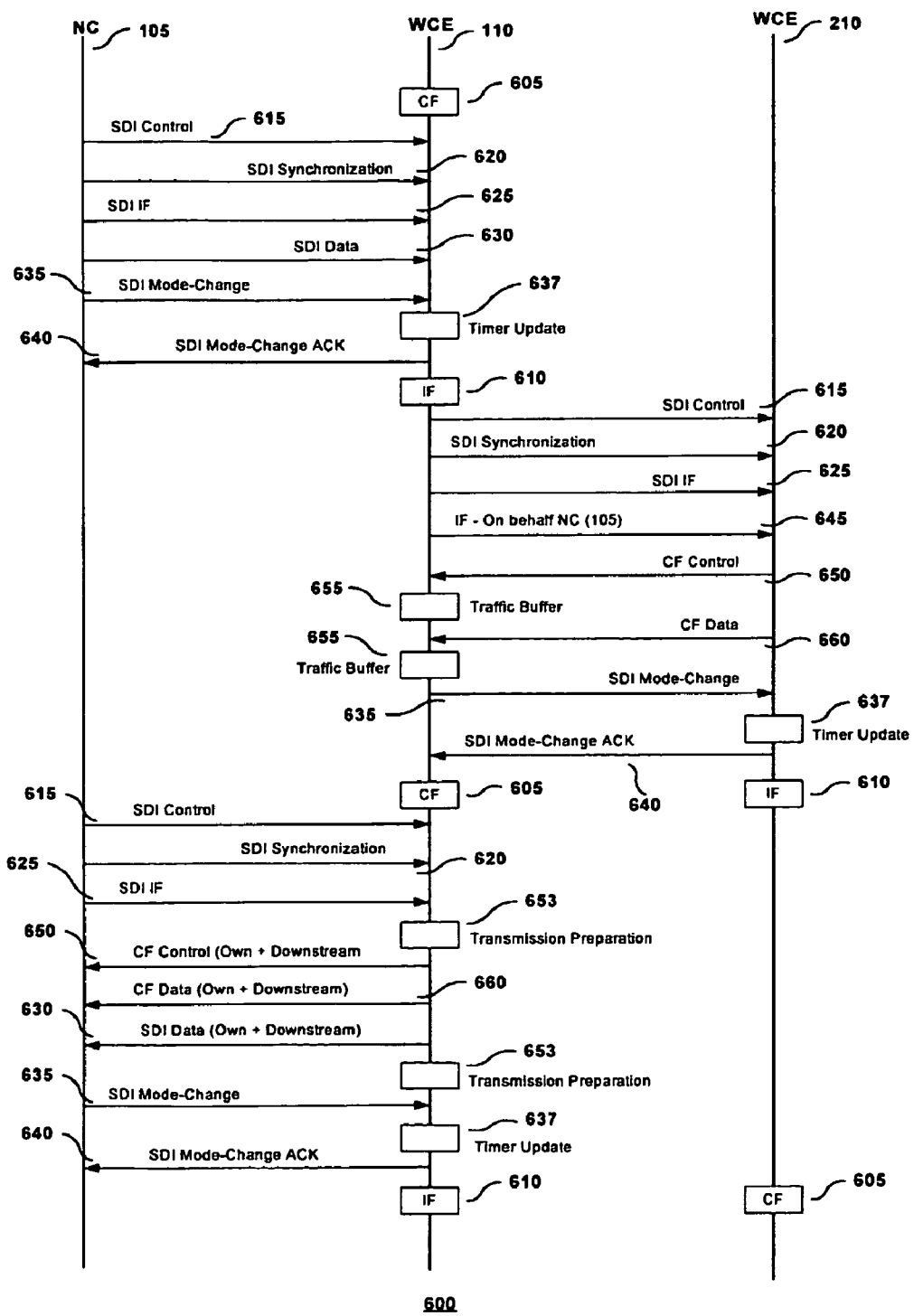
FIG. 6 illustrates a sequence of protocol exchanges following the invention

The sequence of operations (600) for the selective distribution of infrastructure functions and changes among operations modes is described hereinafter with aid of FIG. 6. Sequence (600) is conducted among NC (105) and WCE (110) and WCE (210) of MH (260).

NC (105) and WCE (110) are in communications first in IF-mode and CF-mode, respectively. SDI protocol exchanges are conducted among them. The protocol exchanges may be conducted over other protocols such as IP, TCP, UDP, IETF CAPWAP, IEEE 802.11 and WCDMA. In an exemplification, SDI messages generated by NC (105) and destined for WCE (110) have a Hop-Count field (410) value of '0', Origin Node (420) value of '0' and Destination Node (425) value of '1'. MH-Chain ID field (432) value is set to the identification value of MH (260). Appropriate attributes of the message format (400) are used for various SDI messages.

NC (105) first sends SDI Control messages (615) to WCE (110). These messages comprises information relating to the operation of the present SDI invention. The information may comprise the operational values, radio channel settings and transmission rate parameters. WCE (110) uses contents of the SDI Control messages (615) to configure its operations in accordance with the current invention.

Then NC (105) sends SDI Synchronization messages (620) comprising information relating to the timing schedules of WCE (110) operations. The synchronization messages may also comprise timing schedules for downstream WCEs of MH (260) such as WCE (210). WCE (110) buffers any SDI information related to downstream WCEs for later utilization.

This is followed by the distribution of selected infrastructure functions and associated parameters in SDI IF messages (625). NC (105) provides those infrastructure functions that are to be processed on its behalf by WCE (110). WCE (110) uses the contents of these messages during its IF-mode operations to extend the control of NC (105) across the multihop chain. WCE (110) also buffers SDI IF messages (625) for subsequent forwarding to downstream WCEs such as WCE (120).

Then NC (105) sends SDI Data messages (630). These messages comprise data traffic destined for WCE (110) and also data traffic destined for downstream WCEs such as WCE (210). In an exemplification, SDI Data messages (630) destined for WCE (110) are marked with Destination Node (425) value of '1' while those messages destined for WCE (210) are marked with Destination Node (425) value of '2'. WCE (110) buffers those SDI messages destined for downstream WCEs and forwards them during its IF-mode operations.

Upon expiry of the master clock, NC (105) conducts clock synchronization operations. Here, NC (105) issues SDI Mode-Change trigger (635) to WCE (110). The trigger and its arrival time is used by WCE (110) for a timer update step (637). The update step is to adjust operations timer of WCE (110) to be coordinated with the master clock. After the timer update step (637), WCE (110) responds with a SDI Mode-Change ACK (640). Then WCE (110) changes from CF-mode (605) to IF-mode (610) operations.

In its IF-mode (610) operations, WCE (110) first exchanges SDI messages with WCE (210) operating in CF-mode (605). This comprises exchanges of SDI Control (615), SDI Synchronization (620), SDI IF (625) and SDI Data (630) messages.

Then WCE (110) performs the infrastructure functions (645) on behalf of NC (105). This comprises broadcasting beacon signals, responding to probe signals, monitoring the radio channel and tracking channel and operation metrics.

WCE (210), operating in CF-mode (605), performs client functions. Client control functions (650) comprise responding to beacon signals, broadcasting probe signals, and sending association or connection requests. CF-mode functions also comprise sending data traffic (660) to WCE (110) operating in IF-mode. The data traffic may be generated by WCE (210) or may be received from any downstream WCEs of MH (260).

WCE (110) responds to messages from WCE (210) in accordance with the selected infrastructure functions and associated parameters previously received from NC (105). As WCE (110) processes messages from WCE (210) based on select infrastructure functions on behalf of NC (105), some messages may not be capable of processing. In those cases where WCE (110) cannot process messages from WCE (210), it buffers them for forwarding to NC (105). Messages that WCE (110) is not capable of processing comprise association requests, connection requests and authentication requests.

WCE (110) buffers Messages from downstream WCEs that it is not capable of processing in steps (655). The buffered messages are later aggregated for transmission to NC (105) when WCE (110) operates in CF-mode (605).

Then after the expiry of the IF-mode operations schedule, WCE (110) performs a timer coordination operation with WCE (210). This comprises exchange of SDI Mode-Change trigger (635) and Mode-Change ACK (640) messages. After the timer coordination operation, WCE (210) changes to IF-mode (610) operations. In IF-mode, WCE (210) performs infrastructure functions on behalf of NC (105) based on control information received from WCE (110). Then WCE (110) changes to CF-mode (605) operations for communications with NC (105).

In the CF-mode (605), WCE (110) receives SDI control information from NC (105). This comprises exchanges of SDI Control (615), SDI Synchronization (620), SDI IF (625) and SDI Data (630) messages. These steps are performed after each change in mode of operations.

Then in a step (653), WCE (110) prepares for transmission to NC (105). The step (653) comprises scheduling control and data traffic buffered from previous operations in IF-mode with downstream WCE (210). The step (653) further comprises scheduling control and data traffic of WCE (110) together with the traffic buffered from previous communications. In one aspect of the embodiment, traffic from WCE (110) and traffic from downstream WCEs are assigned consistent scheduling priorities. In another aspect, traffic from and among downstream WCEs is assigned varying priorities with respect to traffic of WCE (110). For example, control traffic from downstream WCEs is assigned greater priorities to account for the longer path distance to NC (105).

After the step (653) of preparing for transmissions, WCE (110) performs its client functions. In a step (650), WCE (110) sends control traffic comprising traffic from WCE (110) and also traffic buffered from previous communications with downstream WCEs such as WCE (210). In a step (660), data traffic comprising traffic from WCE (110) and also traffic buffered from downstream WCEs is sent to NC (105). The steps (650) and (660) may be performed in any relative order while remaining within the scope of the present invention.

WCE (110) also receives data traffic from NC (105) in a step (630). The SDI Data message (630) comprises data traffic for WCE (110) and other downstream WCEs of the multihop chain. NC (105) also sends control traffic for both WCE (110) and other downstream WCEs.

In a step (655), WCE (110) processes control and data traffic received from NC (105). Traffic that is ultimately destined for WCE (110) is directly processed. Such traffic comprises operational parameters for WCE (110) operation in CF-mode and data messages for applications of WCE (110). Traffic destined for WCEs downstream of WCE (110) are buffered in step (655) for later communications in IF-mode (610).

Then after expiry of the operations timer, NC (105) and WCE (110) exchange clock coordination messages, SDI Mode-Change (635) and SDI Mode-Change ACK (640) before WCE (110) changes to IF-mode operations. At this point, WCE (210) also changes its operations mode from IF-mode to CF-mode so as to conduct communications with WCE (110).

The sequence (600) illustrates the coordinated operations of the present invention on selective distribution of infrastructure functions. SDI protocol operations performed in pairs between multihop chain entities operating in IF-mode and CF-mode. The entities then change operations based on established schedules. The sequence (600) highlights the efficient nature of operation of the invention. This allows for implementation ease and consequently, wide-spread deployments. The operations of the invention allow influence of a network controller to be cost-effectively extended over large geographies over multihop chains of WCEs.

Embodiment 7

IEEE Use Case

Figure 7:
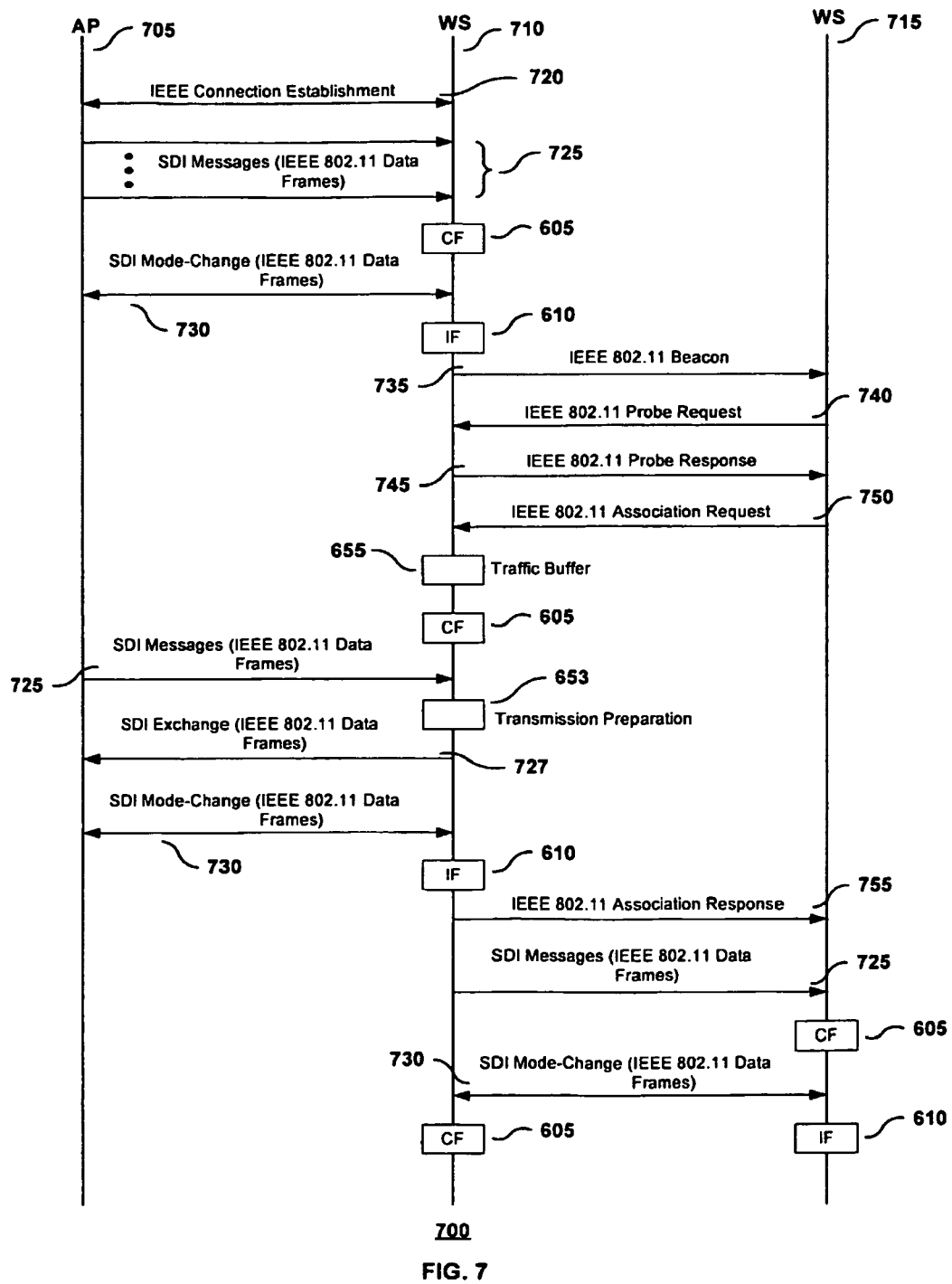
FIG. 7 illustrates a sequence of operations of the invention relating to the IEEE 802.11 specifications.

In an embodiment related to the IEEE 802.11 wireless specifications, operations of the invention are described with respect to IEEE 802.11 operations. Operations sequence (700) of FIG. 7 is used as reference. Here, AP (705) is representative of an access point, WS (710) and WS (715) are representative of wireless stations operating in accordance with the IEEE 802.11 specifications. WS (710) and WS (715) may also represent other access points operating on IEEE 802.11 specifications. The present invention is applicable in all such cases.

In a first instance, AP (705) establishes IEEE 802.11 wireless connection with WS (710) in exchange (720). Here, AP (705) and WS (710) operate in the IEEE 802.11 basic service set (BSS) mode. In the BSS mode, WS (710) becomes a member of the BSS by associating with the AP (705).

In general, a multihop chain entity in accordance with the present invention, operates in the IEEE 802.11 BSS mode when it operates in CF-mode of the invention. This allows the multihop chain entity, said entity in the current embodiment being a wireless station, to respond to IEEE 802.11 Beacon frames, generate IEEE 802.11 Probe frames and generate other IEEE 802.11 control and management frames such as Association Request and Authentication Request frames.

The exchange (720) comprises AP (705) broadcasting IEEE 802.11 Beacon frames on a specific radio channel with a specific beacon intervals. IEEE 802.11 Beacon frames comprise information on service set identifier (SSID), supported data rates and other parameters. The exchange (720) may also comprise WS (710) broadcasting IEEE 802.11 Probe Request frames on various radio channels. AP (705) responds to Probe Request frames with IEEE 802.11 Probe Response frames comprising information similar to that of beacon frames. Exchange (720) also comprises exchange of other IEEE control and management frames such as Association Request/Response, and Authentication Request/Response frames. After the exchange (720), WS (710) has established IEEE 802.11 connection with AP (705).

Next, AP (705) encapsulates SDI protocol messages within IEEE 802.11 data frames before transmitting to WS (705) in steps (725). Each IEEE 802.11 data frame may encapsulate a single or plurality of SDI protocol messages. So SDI protocol messages may be exchanged over a single or plurality of IEEE 802.11 data frames. In one aspect of the invention, SDI protocol messages may be fragmented.

Steps (725) comprises exchange of SDI Control (615), SDI Synchronization (620), SDI IF (625) and SDI Data (630) messages. Information from steps (725) provide WS (710) with the necessary infrastructure functions, association parameters and other control information necessary for operating in accordance with the present invention.

Upon receiving information necessary for operating in accordance with the SDI protocol, WS (710) initiates its CF-mode (605) operations. Further SDI protocol exchanges may be conducted after WS (710) commences CF-mode operations.

Then upon expiry of the operations timer of AP (705), SDI coordination messages are exchanged between AP (705) and WS (710) in step (730). Step (730) comprises exchange of SDI Mode-Change trigger (635) and SDI Mode-Change ACK (640) and also timer update (637) step for WS (710). After the coordination step, WS (710) changes to IF-mode (610) operations.

Here, when WS (710) changes to IF-mode (610) operations, it also changes to IEEE 802.11 independent basic service set (BSS) mode. In the IBSS mode, WS (710) is capable of performing select infrastructure functions on behalf of AP (705) such as IEEE 802.11 Beacon and Probe Response generation and transmission.

In general, a multihop chain entity in accordance with the present invention, operates in the IEEE 802.11 IBSS mode when it operates in IF-mode of the invention. This allows the multihop chain entity, said entity in the current embodiment being a wireless station, to generate and send IEEE 802.11 Beacon and Probe Response, and generate other IEEE 802.11 control and management frames such as Association Response and Authentication Response frames.

The following description details the operations of extending a multihop chain with new WCEs such as WS (715) of FIG. 7.

In its IF-mode (610), WS (710) operates on behalf of AP (705). As a result WS (710) performs select IEEE 802.11 infrastructure operations based on control information received from AP (705). WS (710) performs IF-mode (610) operations in specified radio channel or with specified time offset.

In a first step of IF-mode operations, WS (710) broadcasts IEEE 802.11 Beacon frames (735) comprising information consistent with the IEEE 802.11 Beacon frame broadcast by AP (705). The beacon frames provide information to other wireless stations regarding the presence of a communications network. In the current invention, beacon frames sent by wireless stations of a multihop chain allow coverage of access points to be extended across large areas.

In one case, WS (710) responds to IEEE Probe Request (740) received from WS (715). In such case, WS (710) responds with IEEE Probe Response (745). The IEEE Probe Response (745) comprises information similar to that contained in IEEE Beacon frames (735).

So by operating in IF-mode (610), WS (710) acts as extension of AP (705). Since WS (710) performs infrastructure functions, WS (715) seems to be communicating directly with the WLAN infrastructure, such as AP (705).

Upon receiving IEEE Beacon (735) or IEEE Probe Response (745), WS (715) sends IEEE 802.11 management request frames (750) such as Association Request and Authentication Request. Here, WS (715) attempts to establish IEEE 802.11 wireless connection with the WLAN.

WS (710) buffers IEEE 802.11 management request frames (750) that it is not capable of processing. These frames are buffered in a step (655) for subsequent use when WS (710) operates in CF-mode in communications with its upstream AP (705). The functions necessary for processing these frames are not among the select infrastructure functions distributed by AP (705).

Then after expiry of its operations timer, WS (710) changes to CF-mode operations. In this mode, AP (705) sends SDI messages encapsulated in IEEE 802.11 data frames (725). WS (710) prepares for transmission to AP (705) in a step (653). This step comprises scheduling control and data traffic buffered from previous operations in IF-mode with downstream WS (715) together with scheduling control and data traffic of WS (710).

Then in step (727), WS (710) exchanges data and control traffic—both its own and buffered traffic—with AP (705). The SDI exchanges are encapsulated in IEEE 802.11 data frames.

Then upon expiry of the operation timer, timer coordination exchange (730) is performed.

After this, WS (710) changes to IF-mode (610) operations. In this mode, WS (710) sends responses to IEEE 802.11 management requests made by WS (715) in the previous communications cycle. The IEEE 802.11 management responses (755) may comprise Association Response, Authentication Response and data frames comprising authentication information. After completion of exchange of IEEE 802.11 management response, the IEEE 802.11 wireless connection is established between WS (710) and WS (715).

Upon establishment of the IEEE 802.11 wireless connection, WS (710) conducts SDI protocol exchanges with WS (715). The protocol exchanges (725) comprises exchange of SDI Control (615), SDI Synchronization (620), SDI IF (625) and SDI Data (630) messages. The exchanges provide WS (715) with the necessary infrastructure functions, association parameters and other control information necessary for operating in accordance with the present invention.

WS (715) commences operations in CF-mode (605) after receiving SDI control information from exchange (725). In this mode, WS (715) exchanges control and data traffic in accordance with the invention. All exchanges are encapsulated in IEEE 802.11 data frames between WS (715) and WS (710). The IEEE 802.11 operations such as frame acknowledgements and security are also conducted without affecting the operations of the invention.

Upon expiry of the operations timer, a timer coordination exchange (730) is conducted between WS (710) and WS (715). This exchange is to coordinate the operations schedules of WS (715) to be consistent with the master clock of AP (705).

After the timer coordination exchange, WS (710) changes to operate in CF-mode (605) for communications with AP (705) and WS (715) changes to IF-mode (610) operations. WS (715) then performs the select infrastructure functions on behalf of AP (705). These functions will allow WS (7.15) to extend the coverage of AP (705) and extend the multihop chain to which it belongs.

This embodiment clearly indicates how the SDI protocol and present invention may be integrated with IEEE 802.11 operations. The integration may be by means of a software updates or by means of firmware or hardware updates for access points and wireless stations. The advantage of the invention is that it provides a cost-effect solution to extend wireless communications networks over large geographic areas.

Embodiment 8

CAPWAP

Figure 8:
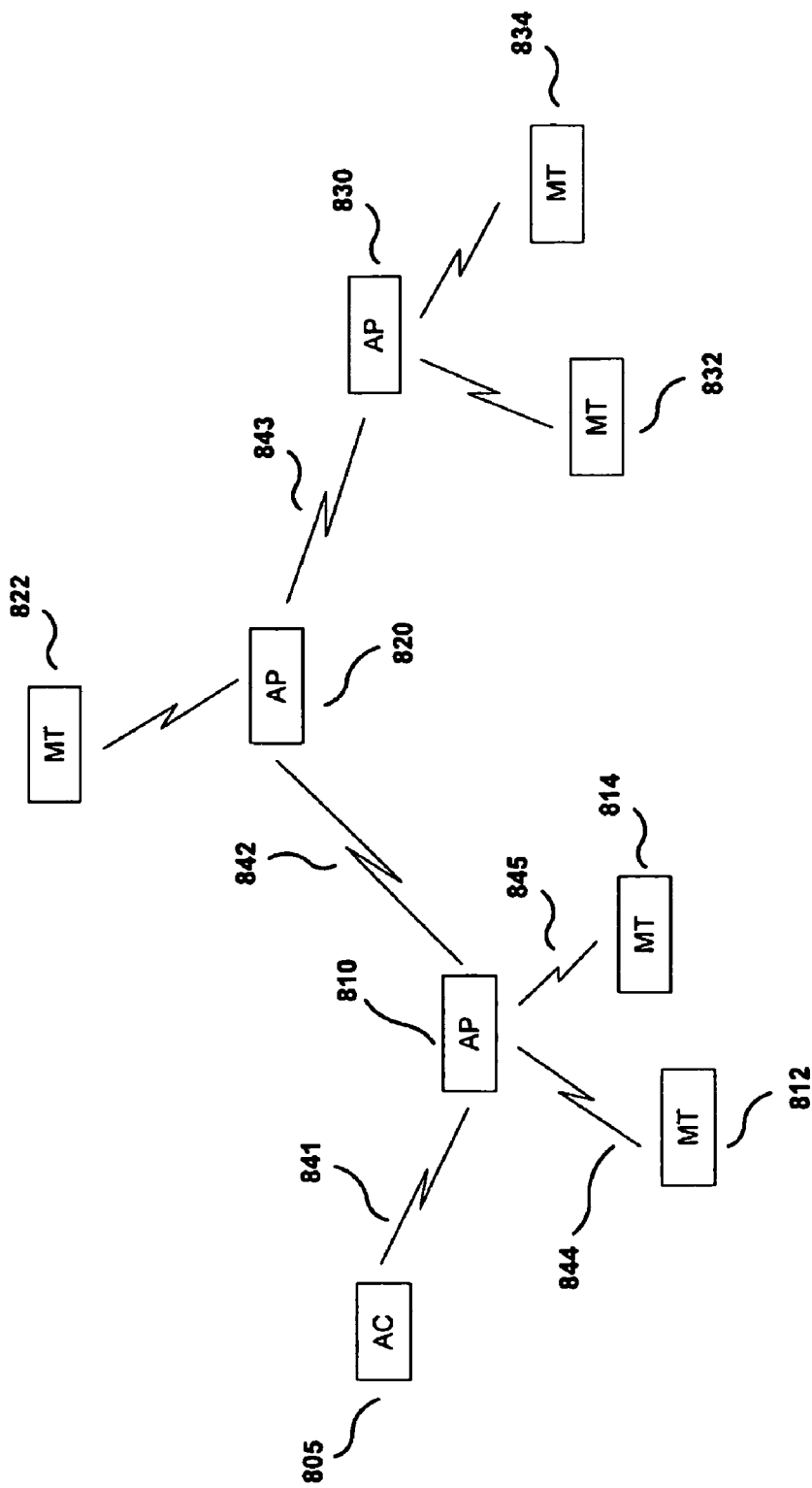
FIG. 8 is representative of a communications network operating in accordance with the present invention relating to the IETF CAPWAP framework.
Figure 9:
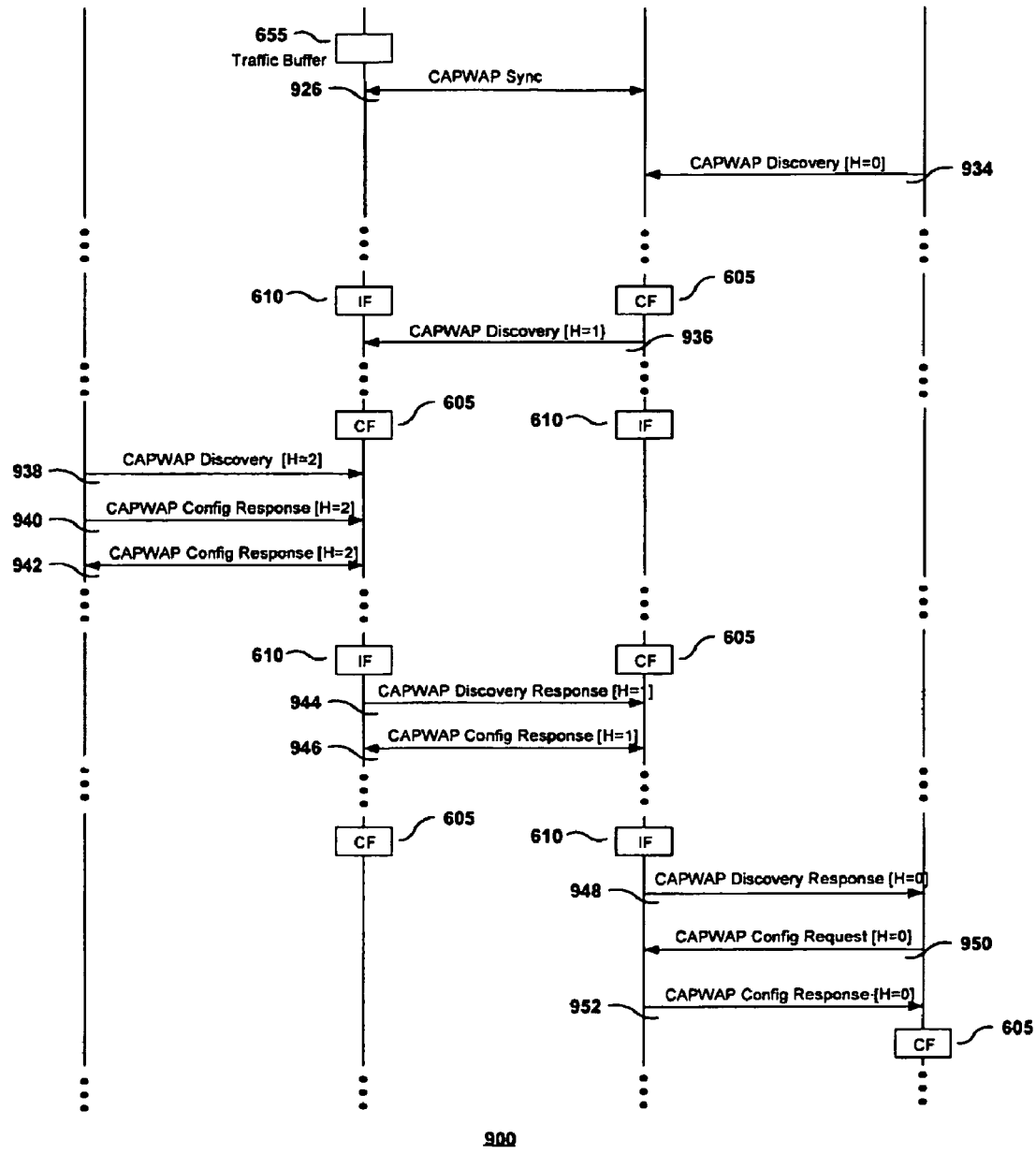
FIG. 9 is illustrative of a sequence of operations of the current invention in relation to the IETF CAPWAP protocol.
Figure 9:
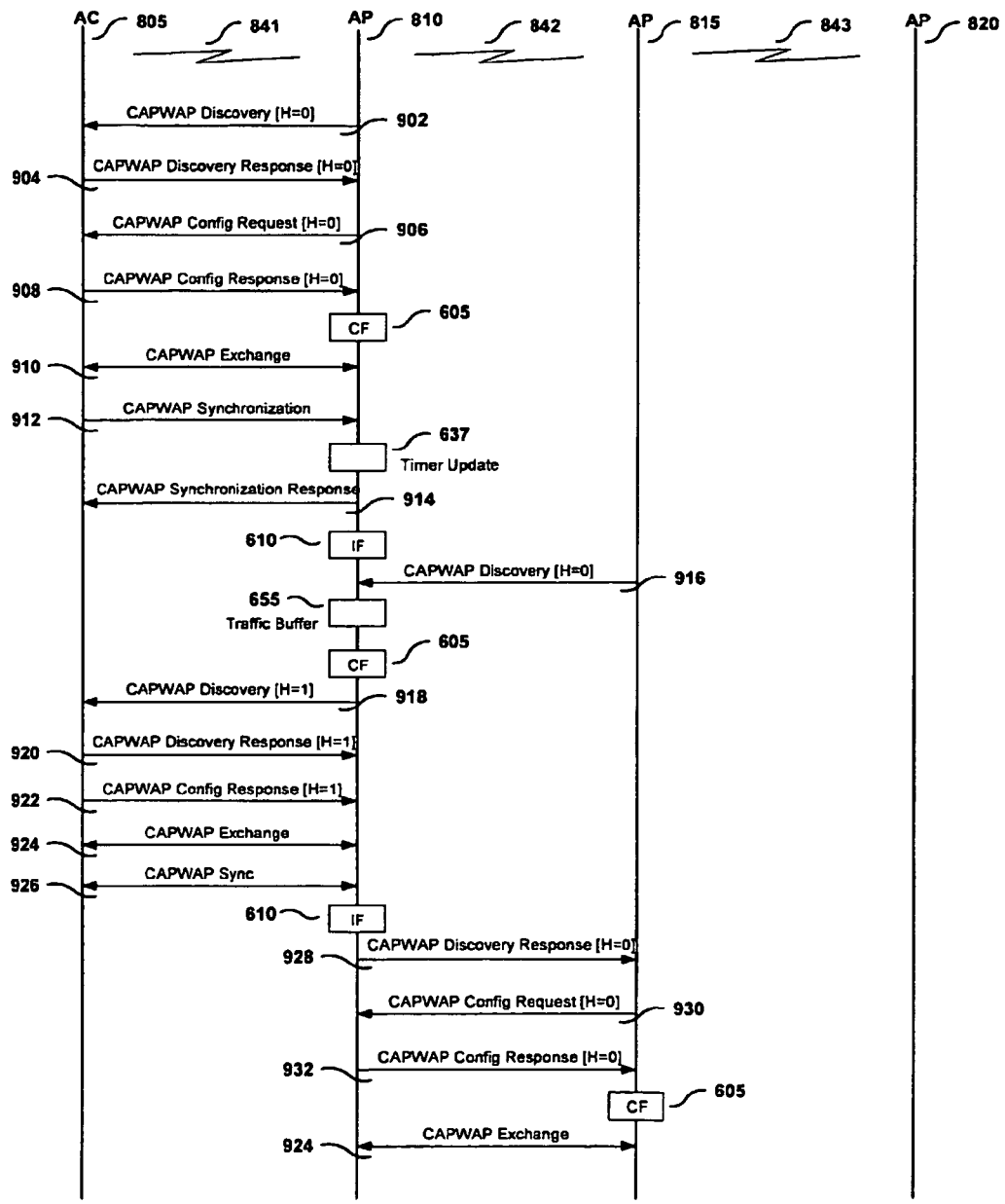
Figure 10:
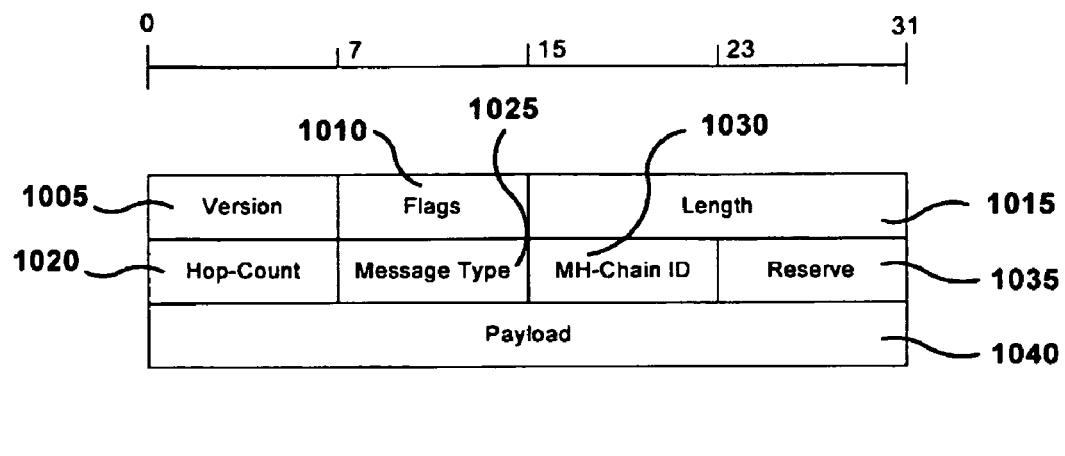
FIG. 10 depicts a message structure in accordance with the invention relating to the IETF CAPWAP protocol.

In an embodiment related to the IETF CAPWAP architecture, the invention operates across multihop chains comprising a plurality of access points. SDI protocol messages are exchanged through encapsulation within IETF CAPWAP protocol exchanges. The embodiment is described hereinafter with reference to CN (800) of FIG. 8, sequence of operations (900) of FIG. 9 and message format (1000) of FIG. 10.

CN (800) is illustrative of a CAPWAP architecture-based multihop chain operating in accordance with the current invention. AC (805) is representative of the centralized access controller managing a single of plurality of access points—AP (810), (820) and (830). AC (805) management of CN (800) comprises resource control and access control. Each of access points AP (810), (820) and (830) provide communications services to their respective mobile terminals MT (812), (814), (822), (832) and (834).

Multihop chain entities of CN (800) are communicably coupled by means of wireless or wired links (841), (842) and (843), based on a single or plurality of communications technologies such as those comprising IEEE 802.11, IEEE 802.16, GPRS, WCDMA, CDMA2000, Ethernet, UWB and Bluetooth. The communications coupling links (841), (842) and (843) may be similar or distinct to the links, such as (844), (845) and (846), communicably coupling MT (812), (814), (822), (832) and (834) with their respective AP (810), (820) and (830). The multihop chain of communications links (841), (842) and (843) is used to exchange operations information in accordance with the current invention. It is also used to exchange data and control traffic relating to the mobile terminals with the access controller and any other external networks.

Message format (1000) is illustrative of the CAPWAP messages exchanged among AC (805), AP (810), (820) and (830). The Version field (1005) indicates the version of the CAPWAP protocol used. Flags field (1010) comprises a single of plurality of flags used to denote specific characteristics of the message exchanges. These characteristics comprise the design of access points, the type of Medium Access Control, (MAC) design, the nature of CAPWAP message—either control or data, retransmission marking and encryption mode. The next Length field (1015) denotes the length of the CAPWAP message.

The Hop-Count field (1020) indicates the number of multihop chain hops related to the CAPWAP message. In the downstream direction, Hop-Count (1020) indicates the number of multihop chain hops required to reach the destination of the CAPWAP message. In the upstream direction, Hop-Count (1020) indicates the number of multihop chain hops made from the source of the CAPWAP message.

The next Message-Type field (1025) denotes the type of CAPWAP message. The type comprises Discovery, Discover Response, Configuration Request, Configuration Response, Synchronization, Key Config, Key Config Response, Capabilities, Capabilities Response, Terminal Addition/Deletion, Terminal Addition/Deletion Response, Notification, Notification Response, Feedback and Feedback Response. Each message type is distinguished by a code.

MH-Chain ID field (1030) identifies the multihop chain within which the CAPWAP message is exchanged. The value is assigned by AC (805).

The following Reserve field (1035) is used for additions to the CAPWAP message.

The Payload field (1040) comprises all additional message elements relating to the type of CAPWAP message. The Payload field content varies for each type of CAPWAP message.

The message sequence (900) illustrates the operational steps performed in accordance with the present invention to establish and operate a CAPWAP architecture-based multihop chain communications network, CN (800). In a first step (902), AP (810) sends CAPWAP Discovery messages (902). These messages may be broadcast or sent to pre-established addresses. The Hop-Count field (1020) is set a value of '0' to indicate that the CAPWAP Discovery message (902) is sent directly by the source of the message, in this case AP (810). In general, in the upstream direction, the Hop-Count field (1020) denotes the number of multihop chain hops traversed by the CAPWAP message from the source of the message. In the upstream direction, each multihop chain entity that is not the ultimate destination of a CAPWAP message increments the Hop-Count field (1020) value by '1' before transmission to the next multihop chain entity.

The CAPWAP Discovery message (902) comprises request for joining the CN (800) under the management of AC (805). The message also comprises identification and other initialization information of AP (810).

Upon receiving a CAPWAP Discovery message (902), AC (805) verifies the identity and authenticity of AP (810). Then depending on the outcome of the identification and authentication steps, a positive or negative CAPWAP Discovery Response message (904) is send. The message comprises the result of the identification and authentication steps and information relating to the security association between AC (805) and AP (810). The Hop-Count field (1020) value of the CAPWAP Discovery Response message (904) is set to '0'. An entity in the multihop chain receiving a CAPWAP message comprising Hop-Count field (1020) value of '0' is the entity for which the message is ultimately destined and at which the message is processed. In general, in the downstream direction, each multihop chain entity receiving a CAPWAP message checks the Hop-Count field (1020) value. If the value is '0', the entity processes the CAPWAP message, else, the entity decrements the value by '1' before transmitting the message in the downstream direction to the next multihop chain entity.

After receiving a positive CAPWAP Discovery Response message (904), AP (810) begins to establish a CAPWAP session with AC (805). The session establishment process is initiated by requesting for configuration information in a CAPWAP Configuration Request message (906). The Hop-Count field (1020) value of this message is '0' to denote it is directly from the source.

AC (805) sends configuration information to AP (810) in a single or plurality of CAPWAP Configuration Response messages (908). The configuration information comprises logical groups assignments, radio settings, processing schedules and schedule setup. The message also comprises information necessary for operating in accordance with the invention such as synchronization information, list of selected infrastructure functions to be performed by AP (810) on behalf of AC (805) and schedule of operation in IF-mode and CF-mode.

Upon receiving the CAPWAP Configuration Response messages (908), AP (810) performs the configurations and updates its operations. Then AP (810) commences its operations in CF-mode (605) with AC (805). While operating in CF-mode, AP (810) performs CAPWAP exchanges (910) with AC (805). The exchanges (910) comprises exchange of control and data traffic in accordance with the invention and in accordance with the present invention.

Then after expiry of an operations timer, AC (805) commences a synchronization phase (926) with AP (810). The synchronization phase comprises sending a CAPWAP Sync message (912) from AC (805) to AP (810). AP (810) uses the arrival time of the message (912) together with its prevailing timer value to adjust its own timer such that the timer is in coordination with that of AC (805). The timer update step (637) accomplishes timer coordination. Next, AP (810) acknowledges the completion of the coordination step with a CAPWAP Sync Response message (914) to AC (805).

After the synchronization phase, AP (810) changes its operation to IF-mode (610).

In the IF-mode, AP (810) performs select infrastructure functions on behalf of AC (805). These functions comprise receiving CAPWAP Discovery message (916) from other access points such as AP (820) and buffering them in a step (655) for later transmission in CF-mode (605). AP (820) initially assigns a value '0' to the Hop-Count field (1020) of the CAPWAP Discovery message (916). Then AP (810), in its CF-mode (605) increments the Hop-Count field value to '1' before transmission to AC (805) in step (918). This is to indicate that the CAPWAP Discovery message (916) is not originally from AP (810), rather it is from a multihop chain entity one hop way from AP (810). So for each multihop chain entity traversed from the source, the Hop-Count field value is incremented by '1'.

AC (805) then responds by sending a CAPWAP Discovery Response message (920) and a single or plurality of CAPWAP Configuration Response messages (922). The Hop-Count field (1020) of (920) and (922) are assigned value of '1'. AC (805) and AP (810) also conduct CAPWAP exchanges (924) and CAPWAP synchronization process (926) before AP (810) changes to IF-mode (610) operations.

In its IF-mode (610), AP (810) checks the Hop-Count field value of message (920) and (922). Since the values are greater than '0', these messages are not ultimately destined for AP (810) rather then are destined for the multihop entity present at an additional one hop. So AP (810) decrements the Hop-Count value of (920) and sends it to AP (820) in a step (928). AP (820) then commences to establish a CAPWAP session by sending a CAPWAP Configuration Request message (932) to AP (810). AP (810) responds by first decrementing the Hop-Count field value of (922) to a value '0' and then transmitting it to AP (820) in a step (820). Then upon performing the configuration in accordance with the invention, AP (820) commences operations in CF-mode (605). This is followed by CAPWAP exchanges (924), buffering operations (655) and synchronization process (926) before AP (820) changes to IF-mode operations and AP (810) changes to CF-mode operations.

When AP (830) enters the multihop chain, it first issues a CAPWAP Discovery message (934) with Hop-Count field value '0' to AP (820). Then as AP (820) changes operations to CF-mode, it increments the Hop-Count value of message (934) to '1' and sends it to AP (810) as a CAPWAP Discovery message (936). Subsequently, AP (810) increments the Hop-Count value of message (934) to '2' before transmission as message (938) to AC (805) during its CF-mode (605) operations.

In the downstream direction, AC (805) sends CAPWAP Discovery Response message (940) and CAPWAP Configuration Response messages (942). These messages are assigned Hop-Count values of '2' to indicate they are 2 hops away from AC (805) in the downstream direction of the multihop chain. Upon receiving messages (940) and (942), AP (810) determines that they are destined for a downstream access point. So before transmission to its direct downstream AP (820), the Hop-Count values are decremented to '1' in messages (944) and (946). Similarly, at AP (820), the Hop-Count values are again decremented to '0' before transmitting CAPWAP Discovery Response message (948) to AP (830). AP (830) then commences its CAPWAP session establishment process by sending a CAPWAP Configuration Request message (950) to AP (820). Then AP (820) responds with CAPWAP Configuration Response messages (952) previously received from AP (810). The Hop-Count values of messages (952) are decremented to '0' before transmission to AP (830).

AP (830) performs configuration and update operations based on the information provided in messages (952) and commences operations CF-mode (605) in accordance with the CAPWAP architecture within the multihop chain framework of the current invention.

This embodiment illustrates how the present invention operates in the IETF CAPWAP context. It shows that the CAPWAP protocol be extended over a multihop chain such that functions of a centralized controller may be extended across a multihop chain configuration of access points communicably coupled by wireless or wired means. This enhances the CAPWAP protocol by making it functional and cost-effective in wireless communications networks covering large geographic areas. The present invention provides mechanisms to efficiently extend the capabilities of CAPWAP architecture based communications networks.

Embodiment 9

Apparatus of MH-Chain Node Operating

Figure 11:
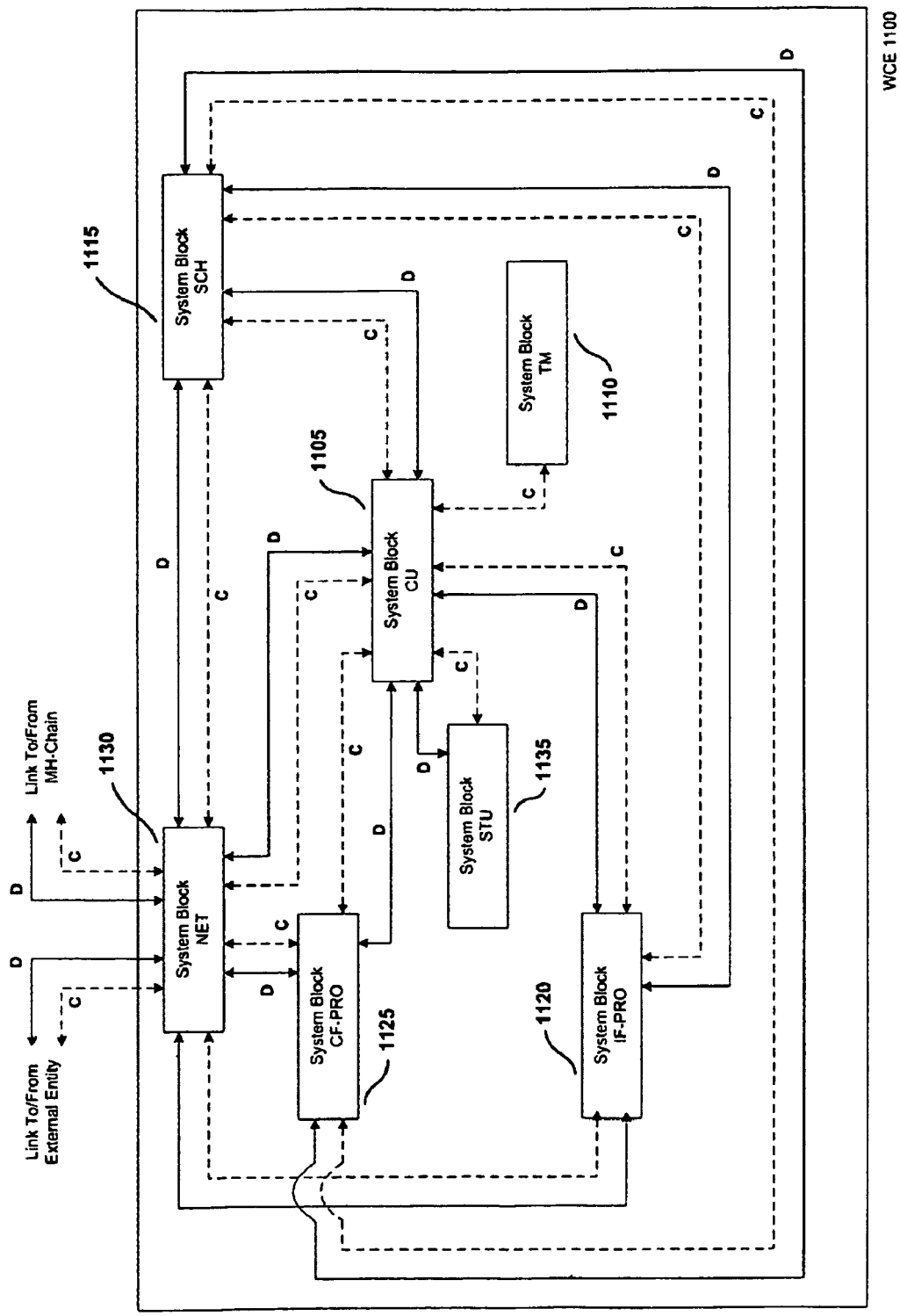
FIG. 11 is illustrative of an apparatus of the wireless communications entity (WCE) in accordance with the present invention.
Figure 12:
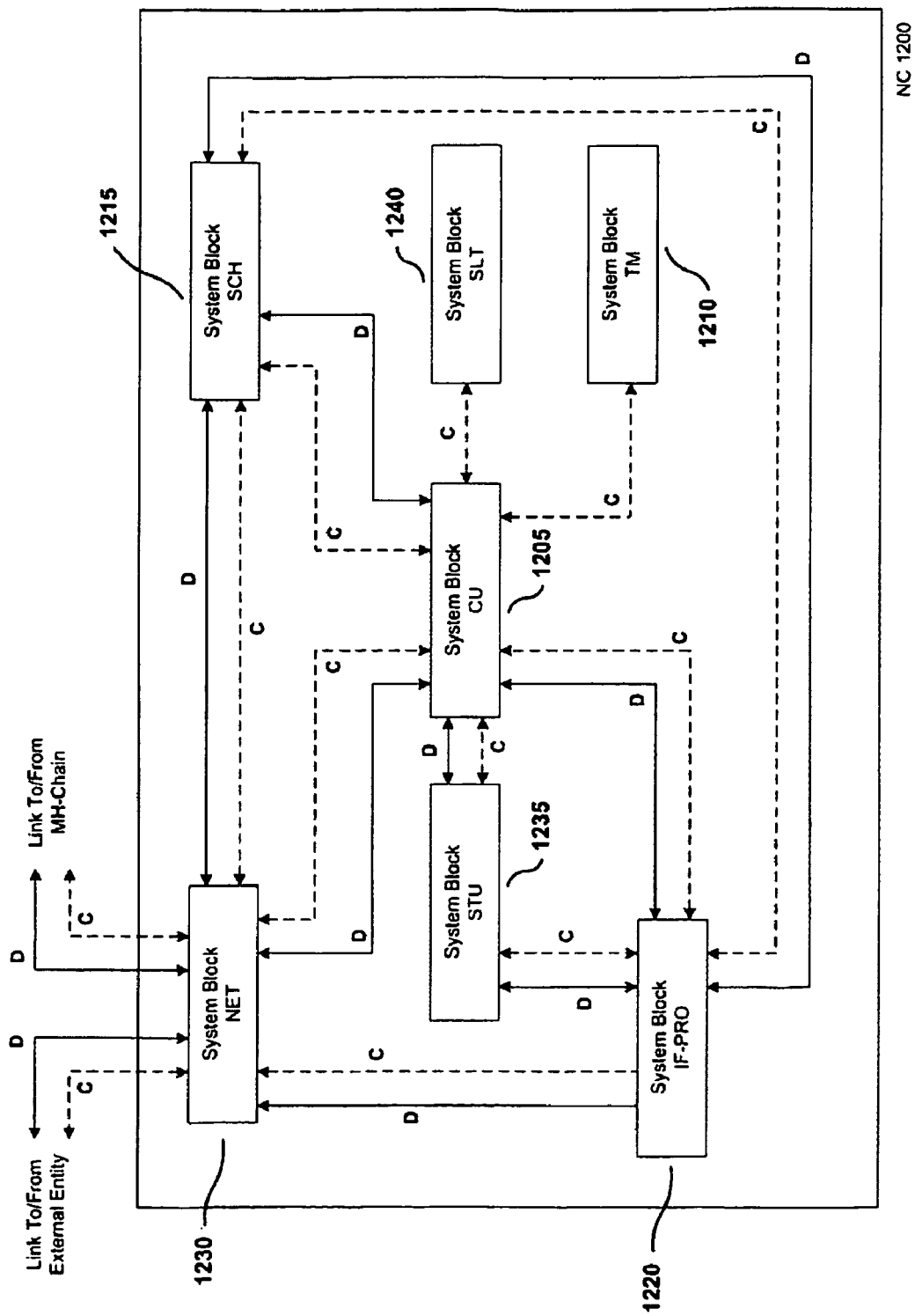
FIG. 12 is illustrative of an apparatus of the network controller (NC) in accordance with the present invention.

FIG. 12 and FIG. 11 illustrate apparatuses of a network controller (1200) and wireless communications entity (1100), respectively, that are embodiments of the present invention for selectively distributing infrastructure functions.

Network controller NC (1200) comprises a number of system blocks such as the Network system block (NET) (1230), which exchanges data and control communications with network entities such as multihop chain WCEs and other networks. Communications frames are exchanged between system blocks on paths corresponding to they type of frames. Consequently, there are two types of paths that are marked with 'D' and 'C', to denote exchange of data and control communications frames, respectively. NET (1230) may operate based on a single or plurality of communications standards such as IEEE 802.11, Ethernet, IEEE 802.16, UWB, GPRS, Bluetooth, WCDMA and CDMA2000. All communications frames received by NET (1230), comprising data and control frames, are appropriately forwarded to other system blocks such as Controlling Unit (CU) (1205), Scheduler (SCH) (1215) and IF-mode processor (IF-PRO) (1220) via the data or control paths.

CU (1205) is the main management system block. It performs computations and processing necessary for the overall control of the communications network comprising a single or plurality of multihop chain configurations. CU (1205) is responsible for determining set of select infrastructure functions to be distributed among multihop chain WCEs for processing on behalf of NC (1200). This system block also computes schedules for multihop chain WCEs for operating in IF-mode and CF-mode. The schedules for each of the multihop chain WCEs are maintained by the schedule list (SCL) (1240) system block. CU (1205) utilizes SCL (1240) to coordinate communications across multihop chains and among the WCEs comprising the multihop chains. CU (1205) interfaces with SCL (1240) over a 'C' path.

CU (1205) also interfaced with timer (TM) (1210) for coordinating operational steps among multihop chain WCEs. TM (1210) maintains the master clock for the multihop chains comprising the communications network controlled by NC (1200). Timers in other WCEs are coordinated with reference to TM (1210).

Data and control communications frames are scheduled for transmission and reception using the scheduler (SCH) (1215). SCH (1215) maintains assigned priorities among communications frames. The scheduler also interfaces with the IF-mode processor (IF-PRO) (1220) system block over 'C' and 'D' paths.

In accordance with the invention, IF-PRO (1220) is the main system block. It distributes select infrastructure functions, determined by CU (1205), to other multihop chains WCEs, for operation on behalf of NC (1200). IF-PRO (1220) performs infrastructure functions in accordance with schedules coordinated by SCH (1215). The system block is also responsible for conduction communications with multihop chain WCEs operating in CF-mode. So IF-PRO (1220) exchanges data and control communications frames from WCEs operating in CF-mode. The exchanges comprise communications frames destined for immediately neighbouring multihop chain WCEs and also for subsequent downstream multihop chain WCEs. NC (1200) communicates with multihop chain WCEs while operating in IF-mode. Conceptually, NC (1200) always operates in IF-mode. In one aspect of the embodiment, IF-PRO (1220) may be a comprising part of CU (1205).

The Storage Unit STU (1235) comprises buffer or memory modules to store data and control information. STU (1235) interfaces with CU (1205) and IF-PRO (1220) over 'D' and 'C' paths.

Wireless communications entity (WCE) (1100) of FIG. 11 comprises similar system blocks to NC (1200) with the exception of the SCL (1240) and with the addition of a CF-mode processor (CF-PRO) (1125).

NET (1130) communicably, couples to neighbour multihop chain WCEs or to network controller NC (1200). System block NET (1130) may operate in accordance with a single or plurality of communications technologies such as IEEE 802.11, IEEE 802.16, Bluetooth, UWB, GPRS, WCDMA and CDMA2000. Operations of NET (1130) comprise receiving infrastructure functions and associated parameters selectively distributed by NC (1200), exchanging control information relating to transport protocols such as IETF CAPWAP and exchanging data traffic with other neighbouring multihop chain WCEs.

CU (1105) uses control information received from NC (1200) to establish the schedule of CF-mode and IF-mode operations within the scheduler SCH (1115). CU (1105) interfaces with SCH (1115) via 'C' and 'D' paths.

Then based on the schedules of SCH (1115), WCE (1100) operates in IF-mode or CF-mode. SCH (1115) interfaces to IF-PRO (1120) and CF-PRO (1125), over 'C' and 'D' paths, and transfers processing control to one of these system blocks on the basis of established schedules. SCH (1115) transfers processing control between system blocks CF-PRO (1125) and IF-PRO (1120) based on timing signals maintained by TM (1110).

TM (1110) is adjusted based on the arrival time of SDI Synchronization message and prevailing value of the timer. So TM (1110) is adjusted to reflect any offsets with reference to the master clock TM (1210) maintained by NC (1200). The system block TM (1110) ensures operations of all WCEs in the multihop chain are coordinated with that of TM (1210). TM (1110) interfaces with CU (1105) over 'C' path and interfaces with SCH (1115) indirectly through CU (1105).

During IF-mode of operations, IF-PRO (1120) of WCE (1100) performs select infrastructure functions on behalf of NC (1200). This way, WCE (1100) extends the geographic coverage of NC (1200). IF-PRO (1120) also buffers control and data traffic received from neighbour multihop chain WCEs operating in CF-mode in STU (1135). These traffic are then used by CF-PRO (1125) during CF-mode schedule. IF-PRO (1120) conducts communications with other multihop chain WCEs in the downstream direction. IF-PRO (1120) also transmits control and data traffic buffered in STU (1135) during previous CF-mode operations with neighbour multihop chain WCEs in the upstream direction.

After expiry of the IF-mode schedule, control is passed to CF-PRO (1125) for operations in CF-mode. CF-PRO (1125) accesses STU (1135) for control and data information buffered from previous IF-mode operations with WCEs in the downstream direction. This system block conducts communications with other multihop chain WCEs or NC (1200) in the upstream direction. Buffered information is transmitted in the upstream direction for ultimate processing by NC (1200). CF-PRO (1125) also receives control and data traffic from the upstream WCEs or NC (1200). These are buffered for later use by IF-PRO (1120) during IF-mode operations. During CF-mode operations, CF-PRO (1125) also updates the timer in TM (1110).

STU (1135) is the system block for aggregating data and control traffic that are ultimately destined for multihop chain WCEs other than WCE (1100). So the system block performs the role of aggregator of different traffic.

SCH (1115) triggers changes in control from IF-PRO (1120) and CF-PRO (1125) via 'C' paths. SCH (1115) also interfaces to the processors via 'D' paths for exchange of communications frames to be scheduled for transmission. Both IF-PRO (1120) and CF-PRO (1125) assign relative priorities to the exchange of traffic originating from WCE (1100) and traffic buffered from previous communications with neighbour multihop chain WCEs or with NC (1200).

In one aspect of the embodiment, CF-PRO (1125) and IF-PRO (1120) may be components of CU (1105).

In another aspect of the embodiment, NET (1130) comprises a single radio element. NET (1130) then operates on distinct radio channels for each of IF-mode and CF-mode operations. SCH (1115) then triggers change in radio channels. For instance, when control of WCE (1100) is passed to IF-PRO (1120), NET (1130) operates in a first radio channel and when control is passed to CF-PRO (1125), NET (1130) operates in a second radio channel.

In yet another aspect of the embodiment, NET (1130) changes operations from IF-mode and CF-mode based on time offsets.

This embodiment highlights the novel system blocks operating in accordance with the current invention. SCL (1240) illustrates the list of selected infrastructure functions that are distributed and CF-PRO (1125) and IF-PRO (1120) illustrate the processors for operating on the selected infrastructure functions.

Embodiment 10

Flow Chart

Figure 13:
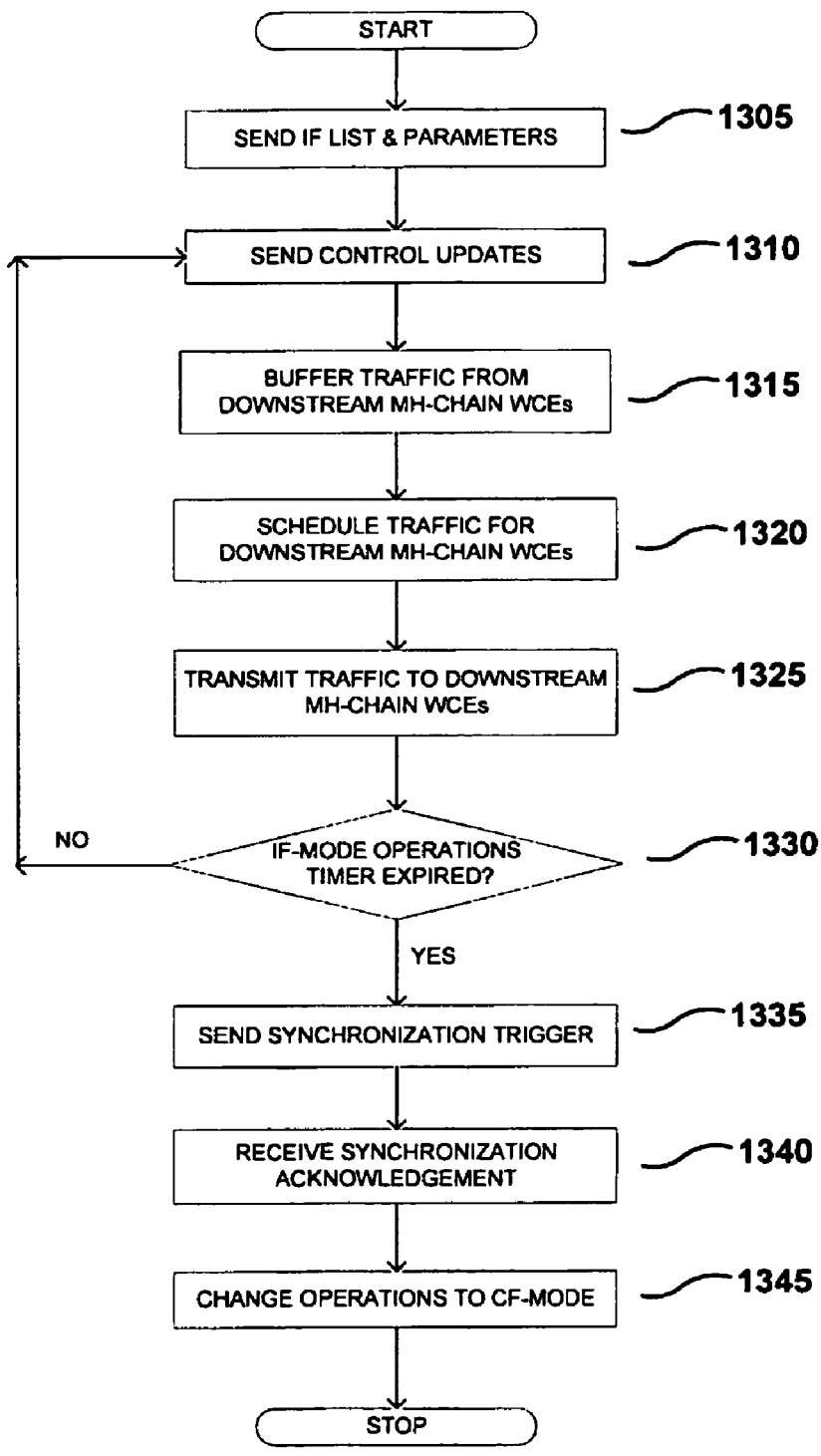
FIG. 13 depicts a flowchart of the sequence of operations of the IF-mode operations of the present invention.
Figure 14:
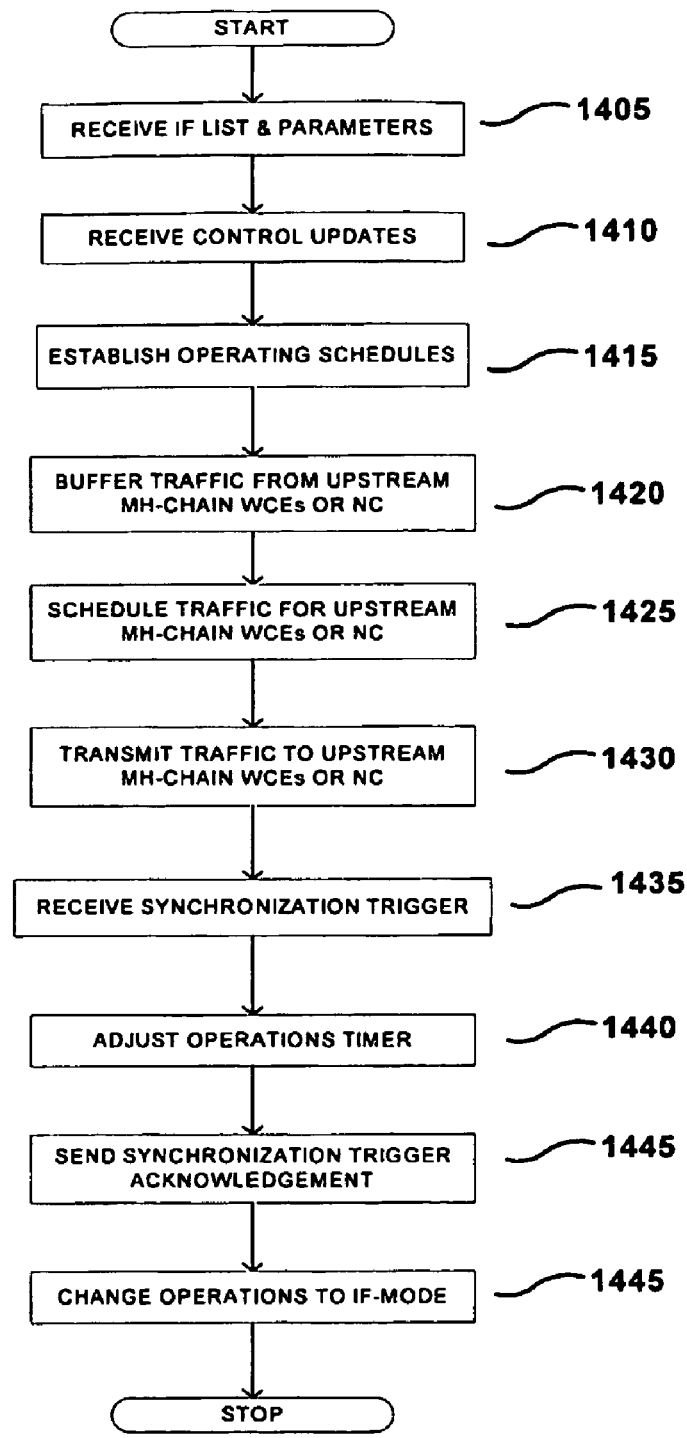
FIG. 14 depicts a flowchart of the sequence of operations of the CF-mode operations of the present invention.

Flowchart (1300) of FIG. 13 and flowchart (1400) of FIG. 14 illustrate steps performed by network entities operating in IF-mode and CF-mode, respectively, in accordance with the invention for selectively distributing infrastructure functions.

In IF-mode of operations (1300), in a first step (1305), network controller or other upstream multihop chain WCE sends lists of select infrastructure functions and associated parameters to downstream multihop chain WCEs. This is to prepare downstream WCEs to perform select infrastructure functions of (1305) on behalf of a network controller. The step comprises message structures of infrastructure functions, instructions for message construction, parameter values used for infrastructure functions, operating schedule information and radio channel metrics. In one embodiment of the invention, step (1305) also comprises sending of processing schedules to downstream WCEs for performing the select infrastructure functions.

Next, further control information updates are sent in a step (1310). The step (1310) may comprise changes to lists of select infrastructure functions and associated parameters.

In CF-mode of operations (1400), the step (1405) is performed in response to step (1305). The step (1405) comprises receiving information corresponding to select infrastructure functions and updating the operations of the receiving multihop chain WCEs. Control updates are received in step (1410) of CF-mode in response to step (1310). This step comprises updating the operations of the WCE. Next, in CF-mode, operating schedules are updated in step (1415). The step (1415) comprises establishing the schedule for WCEs operations in CF-mode and IF-mode.

Then during IF-mode operations (1300), a buffering step (1315) is performed. The step comprises buffering data and control traffic received from downstream neighbour multihop chain WCEs. Step (1315) may also comprise aggregating traffic based on criteria such as distinction between data and control, timing constraints, traffic source or destination and arrival order.

Then in a step (1320), traffic is scheduled for transmission to downstream neighbour multihop chain WCEs. The traffic comprises buffered traffic received from previous communications and traffic generated by entity operating in IF-mode. In one aspect of the embodiment, the scheduling step (1320) assigns higher priorities to buffered control traffic than other traffic. In another aspect, priorities are assigned based on traffic arrival time or traffic generation time. Next, in a transmission step (1325), scheduled traffic is transmitted to downstream neighbour multihop chain WCEs. The step (1325) may comprise operations in distinct radio channel from operations in CF-mode. Transmission step (1325) may be conducted over a single or plurality of communications technologies such as IEEE 802.11, IEEE 802.16, UWB, Bluetooth, GPRS, WCDMA, CDMA2000, WDM and Ethernet.

In the corresponding operations in CF-mode (1400), traffic received from upstream neighbour multihop chain WCEs or NC is buffered in step (1420). The buffered traffic comprises data and control information destined for further downstream multihop chain WCEs. The step (1420) may further comprise aggregating data and control traffic received from upstream multihop Chain WCEs. Next, in step (1425) traffic is scheduled for transmission to upstream multihop chain WCEs or NC in a further step (1430). The scheduling operations of step (1425) are similar to those of step (1320) in IF-mode.

Next, in IF-mode operations (1300), the operations timer is checked for expiry in step (1330). The timer coordinates the schedule of IF-mode and CF-mode operations. If the timer for IF-mode operations has not expired, control is transferred to updates step (1310). So the IF-mode operations are continued. If the timer expires, a synchronization trigger is sent to the neighbour downstream multihop chain WCE to signal change in operations. The trigger step (1335) may sending a trigger message.

In the corresponding operations for CF-mode (1400), the synchronization trigger is received in step (1435). Next, the operations timer is adjusted based on the arrival time of the synchronization trigger and any prevailing offset of the operations timer. The timer adjustment step (1440) coordinates the timing operations of WCEs with reference to the master clock of the network controller. In one aspect of the embodiment, the operations timer of the WCE receiving the synchronization trigger is advanced or turned back based on the degree to which the synchronization trigger is received prior to or after expiry of the operations timer.

Then after the adjustment step (1440), a synchronization acknowledgement is sent in a step (1445). The step (1445) serve to notify the upstream neighbour multihop chain WCE or NC that the timer has been adjusted and that the timers of the CF-mode entity and IF-mode entity are in coordination. In IF-mode operations (1300), the synchronization acknowledgement is received in step (1340).

Then entity operating in IF-mode, changes operations to CF-mode and transfers control to the CF-mode processor in step (1345). The entity operating in CF-mode, changes operations to IF-mode and transfers control the IF-mode processor in step (1450).

This embodiment highlights the sequence of selective functions distribution and operational mode changes that help extend the control of a network controller across multihop chain configurations. It also highlights the efficiency of the invention is extended control over large geographic areas across a plurality of wireless communications entities.

INDUSTRIAL APPLICABILITY

The aforementioned embodiments of the invention illustrate the applications of the invention for selective distribution of infrastructure functions. The embodiments show how the invention helps to extend network control over large geographic areas in a cost-effective manner.

The invention claimed is:

1. A wireless communication system for configuring a multihop chain with one network controller and a plurality of communication entities, the system comprising:
   the network controller configured to manage an infrastructure function which includes a function to control network resource of the multihop chain, and assign a part of the infrastructure function to at least one communication entity; and
   the communication entity configured to switch its function between the assigned part of the infrastructure function and a client function alternately, wherein
   the assigned part of the infrastructure function includes a function to control network resource of a part of the multihop chain corresponding to a downstream side of the communication entity,
   the client function includes a function to perform communication using the network resource controlled by a part of the infrastructure function that is assigned to another communication entity on an upstream side of the communication entity, and the communication entity is further configured to (i) receive a Mode-Change trigger signal instructing change of the function to be executed by the communication entity either from the other communication entity on the upstream side or from the network controller, and (ii) change the function between the assigned part of the infrastructure function and the client function according to the received Mode-Change trigger signal.

2. The wireless communication system according to claim 1, wherein the communication entity is configured to switch its function according to a schedule designated either by the network controller or by the other communication entity on the upstream side.

3. The wireless communication system according to claim 1, wherein
the communication entity is further configured to measure elapsed time interval between receiving the Mode-Change trigger signal and expiry of its own timer, and adjust the timer according to the measured time interval.

4. The wireless communication system according to claim 1, wherein
the assigned part of the infrastructure function includes a function to measure radio channel.

5. A method of configuring a multi-hop chain including (i) a network controller managing an infrastructure function which includes a function to control network resource of the multi-hop chain and (ii) a plurality of communication entities, comprising the steps of:

assigning, by the network controller, a part of the infrastructure function to one of the plurality of communication entities; and switching a function of said one of the communication entities between the assigned part of the infrastructure function and a client function alternately, wherein the assigned part of the infrastructure function includes a function to control network resource of a part of the multihop chain corresponding to a downstream side of said one of the communication entities, the client function includes a function to operate said one of the communication entities using the network resource controlled by a part of the infrastructure function that is assigned to another communication entity on an upstream side of said one of the communication entities, and the switching step further comprises receiving, at said one of the communication entities, a Mode-Change trigger signal instructing change of the function to be executed by said one of the communication entities, which is sent from the other communication entity in the upstream side or from the network controller, and said one of the communication entities is configured to change the function between the assigned part of the infrastructure function and the client function according to the received Mode-Change trigger signal.

6. The method according to claim 5, wherein the switching of the function of said one of the communication entities is performed according to a schedule designated either by the network controller or by the other communication entity on the upstream side.

7. The method according to claim 5, further comprising,
measuring, at said one of the communication entities, elapsed time interval between receiving the Mode-Change trigger signal and expiry of its own timer; and
adjusting the timer according to the measured time interval.

8. The method according to claim 5, wherein
the assigned part of the infrastructure function includes a function to measure radio channel.

9. A communication entity comprising:

a receiving section configured to receive an instruction to perform a part of a infrastructure function assigned by a network controller, the infrastructure function being managed by the network controller and including a function to control network resource of a multihop chain; and a switching section configured to switch a function of the communication entity between the assigned part of the infrastructure function and a client function alternately, wherein the assigned part of the infrastructure function includes a function to control network resource of a part of the multihop chain corresponding to a downstream side of the communication entity, the client function includes a function to operate the communication entity using the network resource controlled by a part of the infrastructure function that is assigned to another communication entity on an upstream side of the communication entity, and the communication entity is further configured to (i) receive a Mode-Change trigger signal instructing change of the function to be executed by the communication entity either from the other communication entity on the upstream side or from the network controller, and (ii) change the function between the assigned part of the infrastructure function and the client function according to the received Mode-Change trigger signal.

10. The communication entity according to claim 9, wherein the switching section switches the function according to a schedule designated either by the network controller or by the other communication entity on the upstream side.

11. The communication entity according to claim 9, further configured to measure elapsed time interval between receiving the Mode-Change trigger signal and expiry of its own timer, and adjust the timer according to the measured time interval.

12. The communication entity according to claim 9, wherein the assigned part of the infrastructure function includes a function to measure radio channel.

* * * * *